(12) United States Patent
Wyler

(10) Patent No.: US 9,590,722 B2
(45) Date of Patent: Mar. 7, 2017

(54) SYSTEM AND METHOD FOR SATELLITE COMMUNICATION

(71) Applicant: O3B Limited, St. Helier, Jersey (JE)

(72) Inventor: Gregory Thane Wyler, Sewalls Point, FL (US)

(73) Assignee: O3b Networks Limited (GB)

( * ) Notice: Subject to any disclaimer, the term of this patent is extended or adjusted under 35 U.S.C. 154(b) by 0 days.

(21) Appl. No.: 14/157,219

(22) Filed: Jan. 16, 2014

(65) Prior Publication Data

US 2014/0320338 A1  Oct. 30, 2014

Related U.S. Application Data

(63) Continuation of application No. 12/761,839, filed on Apr. 16, 2010, now abandoned, which is a continuation of application No. PCT/US2007/081763, filed on Oct. 18, 2007.

(51) Int. Cl.
*H04B 7/185* (2006.01)

(52) U.S. Cl.
CPC ....... *H04B 7/1851* (2013.01); *H04B 7/18513* (2013.01)

(58) Field of Classification Search
USPC ....... 342/154, 352, 354, 373; 455/12.1, 13.3
See application file for complete search history.

(56) References Cited

U.S. PATENT DOCUMENTS

| | | | |
|---|---|---|---|
| 5,424,862 A | 6/1995 | Glynn | |
| 5,444,449 A | 8/1995 | Paskett et al. | |
| 5,582,367 A | 12/1996 | Castiel et al. | |
| 5,669,585 A | 9/1997 | Castiel et al. | |
| 5,678,175 A | 10/1997 | Stuart et al. | |
| 5,739,784 A | 4/1998 | Jan et al. | |
| 5,845,206 A | 12/1998 | Castiel et al. | |
| 5,920,804 A | 7/1999 | Armbruster et al. | |
| 5,931,417 A | 8/1999 | Castiel | |

(Continued)

OTHER PUBLICATIONS

Danesfahani, et al., "A Constellation of Medium Earth Equatorial Orbit—Satellites for Continuous Coverage of Iran", May 2005, pp. 15, vol. 12th, Publisher: http://74. I 25. I I 3.132/search?q=cache:r-N-b0yEdEUJ:www.danesfahani.com/SatelliLs/ICT05__constellation__Jlaper.pdf+equatorial+orbits+meo&cd=6&hl=en&, Published in: SA.

(Continued)

*Primary Examiner* — Dao Phan
(74) *Attorney, Agent, or Firm* — Kaplan Breyer Schwarz & Ottesen, LLP

(57) ABSTRACT

A system and method are disclosed which may include providing at least one satellite having a plurality of beamformers configured to provide a plurality of respective beams having a plurality of different respective fixed pitch angles about an axis of the satellite; causing the at least one satellite to move around the earth along a non-geostationary orbit; establishing a data communication path between a first of the beamformers on the satellite and a communication target, the data communication path having a satellite end at the first beamformer and an target end at the communication target; shifting the satellite end of the data communication path through a succession of the beamformers as the satellite moves along its orbit; and at least substantially reducing an amount of RF wave energy directed to beamformers of the plurality of beamformers not forming part of the data communication path.

35 Claims, 23 Drawing Sheets

(56) References Cited

U.S. PATENT DOCUMENTS

| | | |
|---|---|---|
| 5,957,409 A | 9/1999 | Castiel et al. |
| 6,032,041 A | 2/2000 | Wainfan et al. |
| 6,102,335 A | 8/2000 | Castiel et al. |
| 6,118,998 A | 9/2000 | Wismer et al. |
| 6,122,596 A | 9/2000 | Castiel |
| 6,195,037 B1 | 2/2001 | Gross et al. |
| 6,227,497 B1 | 5/2001 | Draim |
| 6,236,834 B1 | 5/2001 | Poskett et al. |
| 6,263,188 B1 | 7/2001 | Castiel et al. |
| 6,339,707 B1 | 1/2002 | Wainfan et al. |
| 6,393,255 B1 | 5/2002 | Lane |
| 6,457,678 B1 | 10/2002 | Draim |
| 6,487,476 B1 | 11/2002 | Draim |
| D466,613 S | 12/2002 | Castiel |
| 6,490,448 B1 | 12/2002 | Hogberg et al. |
| 6,511,020 B2 | 1/2003 | Higgins |
| 6,570,859 B1 | 5/2003 | Cable et al. |
| 6,577,864 B2 | 6/2003 | Castiel et al. |
| 6,597,989 B2 | 7/2003 | Castiel |
| 6,611,683 B1 | 8/2003 | Castiel et al. |
| 6,678,519 B2 | 1/2004 | Castiel et al. |
| 6,695,260 B2 | 2/2004 | Castiel et al. |
| 6,704,543 B1 | 3/2004 | Sharon et al. |
| 6,766,166 B1 | 7/2004 | Draim |
| 6,795,687 B1 | 9/2004 | Castiel |
| 6,859,169 B2 | 2/2005 | Jones et al. |
| 6,954,613 B1 | 10/2005 | Castiel et al. |
| 7,026,989 B1 | 4/2006 | Minkoff et al. |
| 7,277,673 B2 | 10/2007 | Castiel |
| 2002/0080066 A1 | 6/2002 | Dent |
| 2004/0093132 A1 | 5/2004 | Capots et al. |
| 2004/0157554 A1 | 8/2004 | Wesel |
| 2006/0192056 A1 | 8/2006 | Castiel et al. |

OTHER PUBLICATIONS

"Parent U.S. Appl. No. 12/761,839 Office Action", Mar. 12, 2013, Publisher: USPTO, Published in: US.

"Parent U.S. Appl. No. 12/761,839 Office Action", Jul. 16, 2013, Publisher: USPTO, Published in: US.

Danesfahani, et al., "A Novel Constellation of Satellites", 2006, pp. 2491-2495, Publisher: 0-7803-9521-2006 IEEE, Published in: Iran.

"Related International Application No. PCT/US08/75372 International Preliminary Examination Report", Nov. 4, 2010, Publisher: PCT, Published in: US.

"International Patent Application No. PCT/US07/81753 International Search Report and Written Opinion of the ISA", Oct. 3, 2008, Publisher: PCT, Published in: US.

"International Patent Application No. PCT/US08/75372 International Search Report and Written Opinion of the ISA", Nov. 18, 2008, Publisher: PCT, Published in: US.

"International Patent Application No. PCT/US07/81763 International Preliminary Report on Patentability", Aug. 30, 2010, Publisher: PCT, Published in: US.

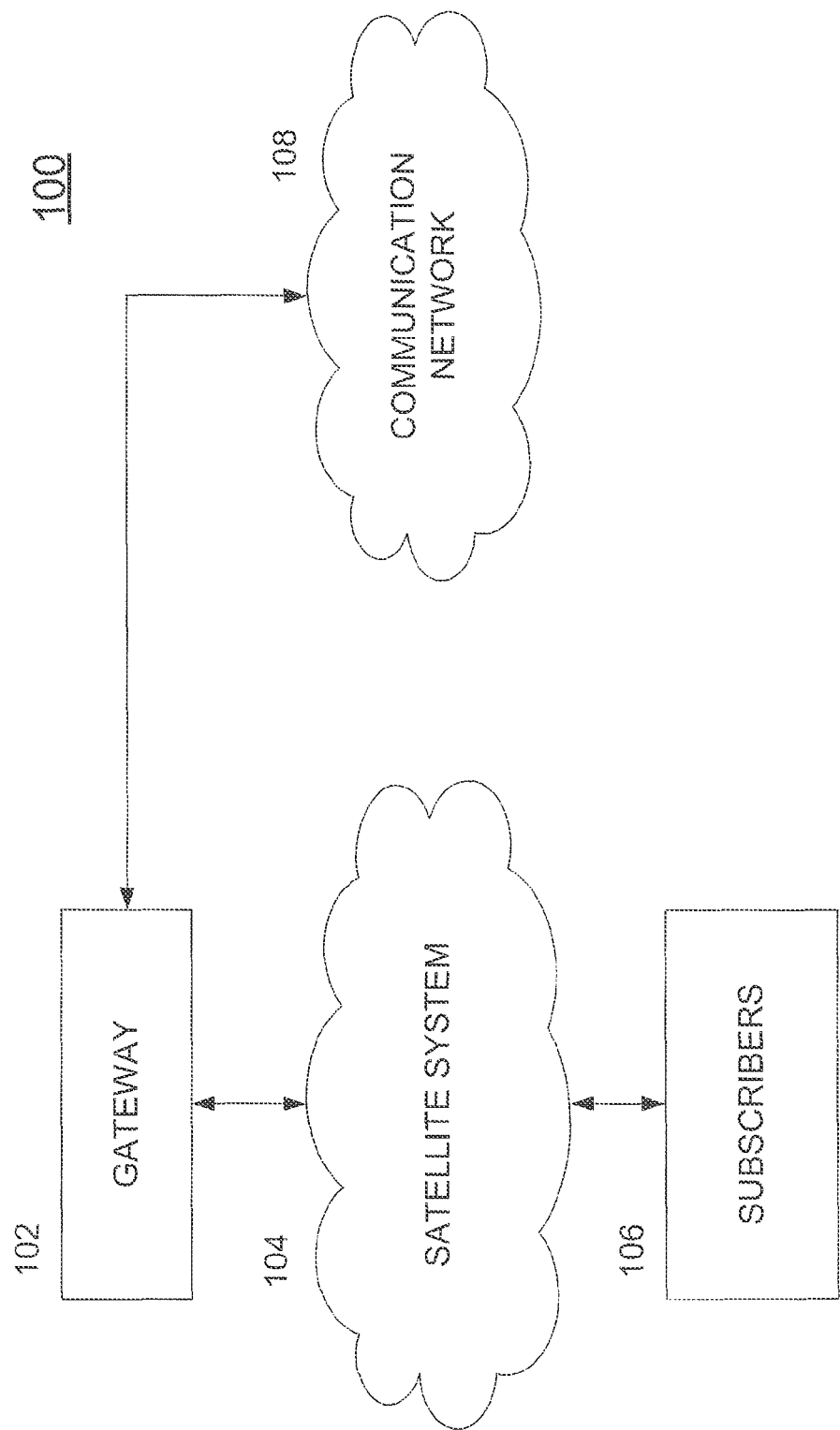

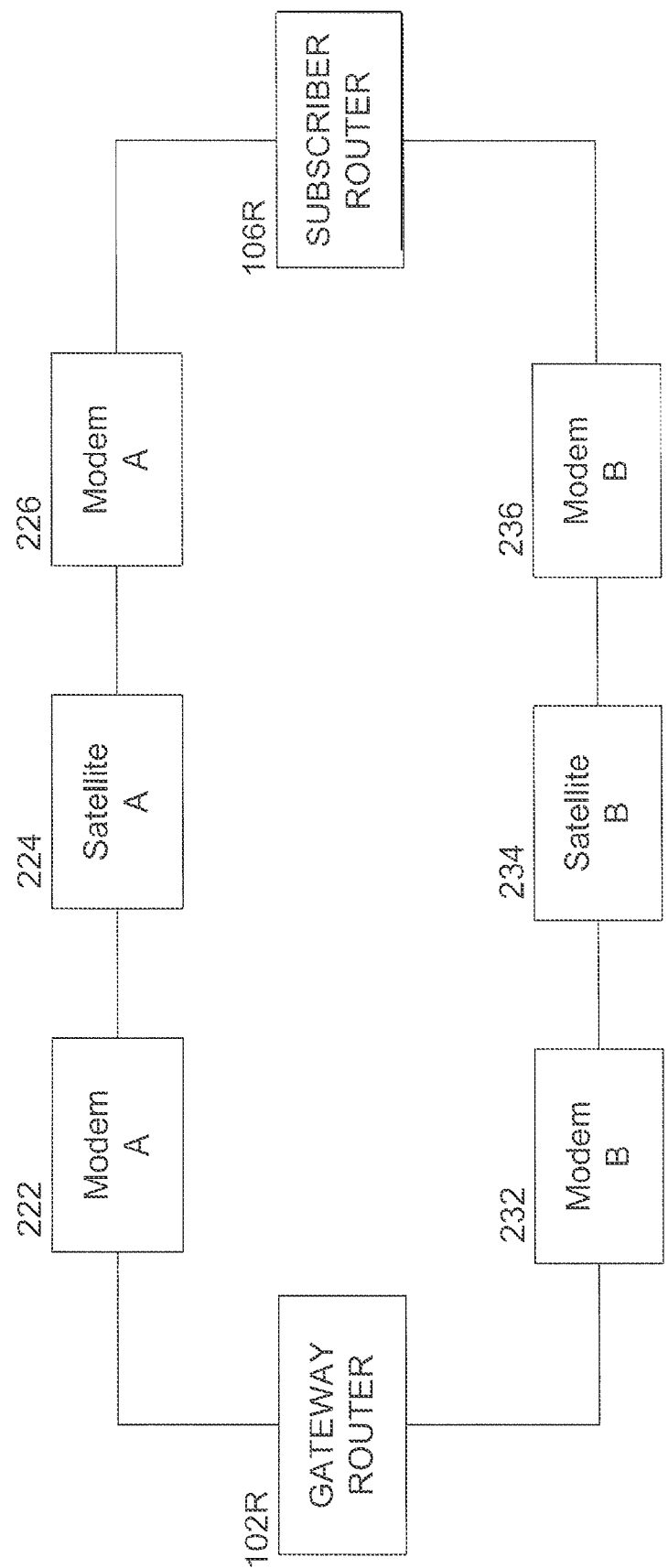

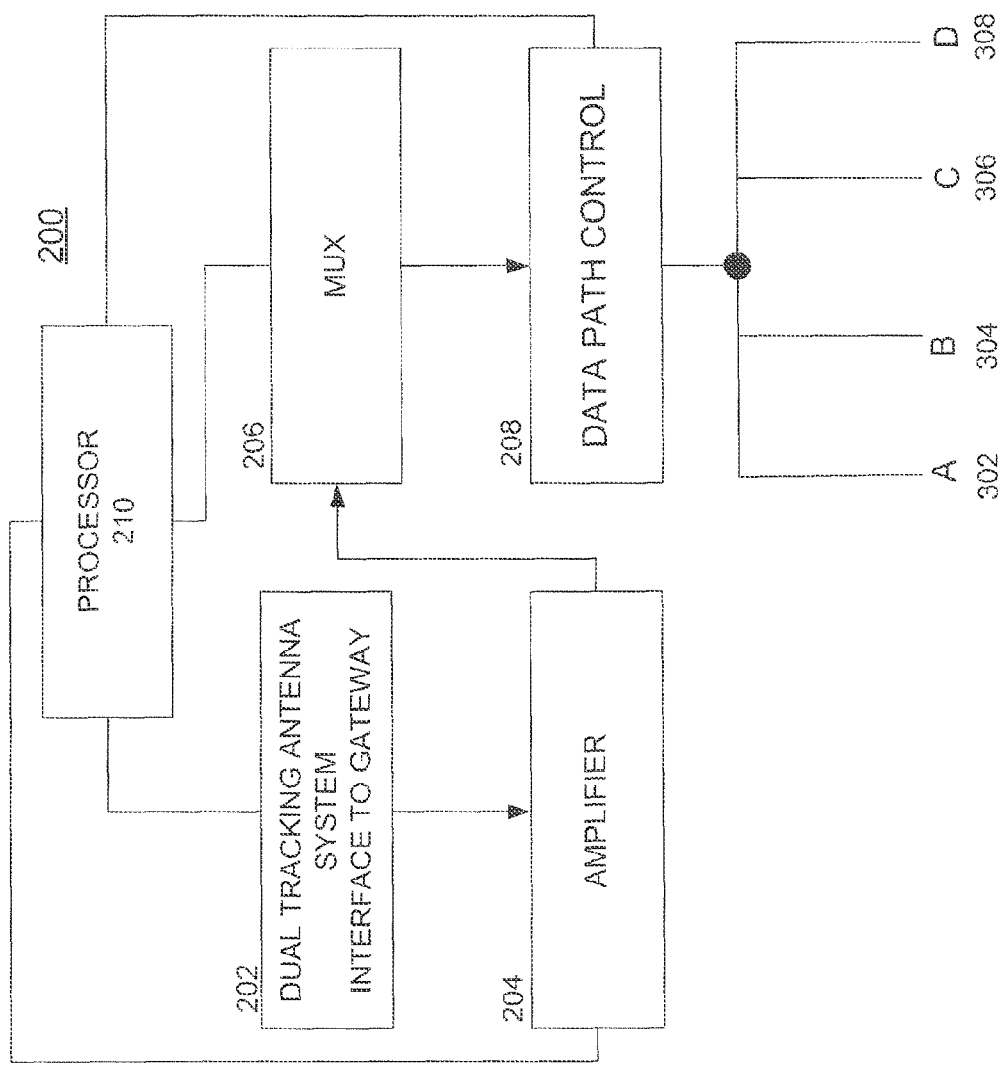

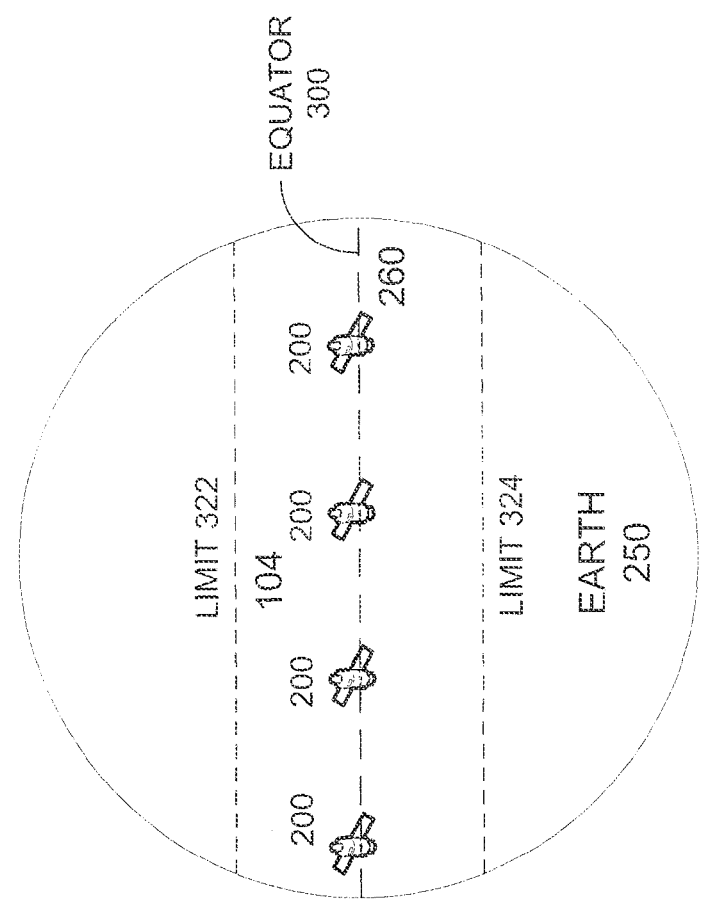

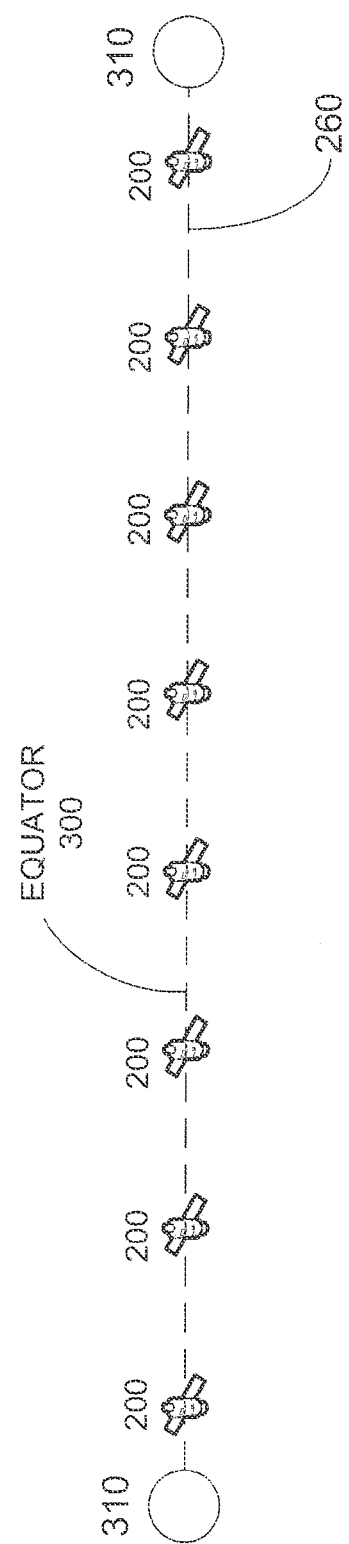

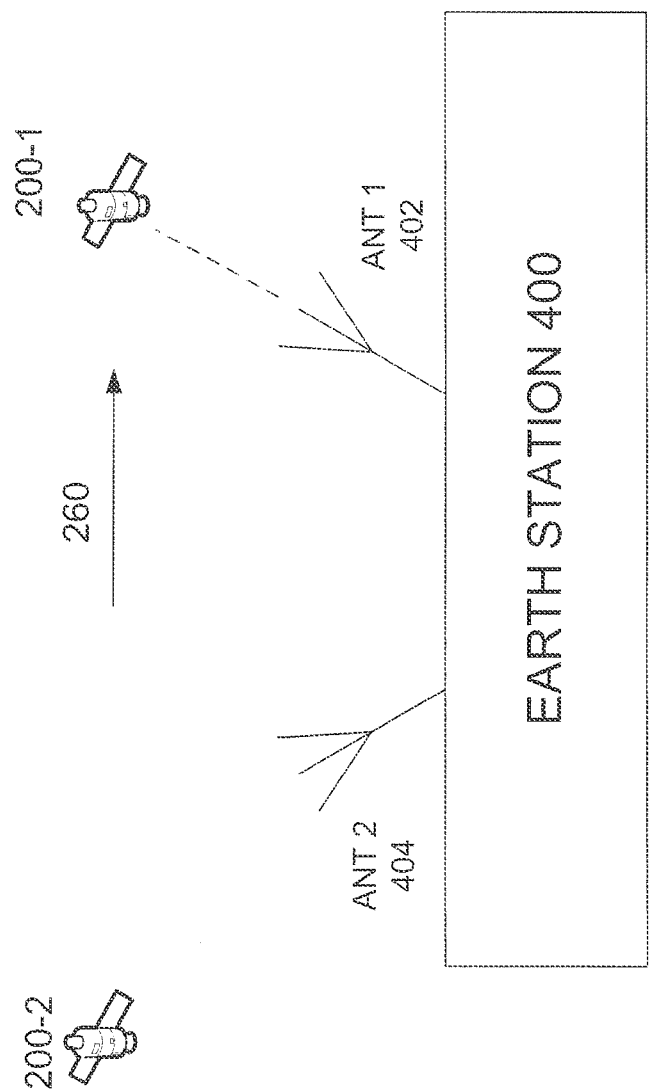

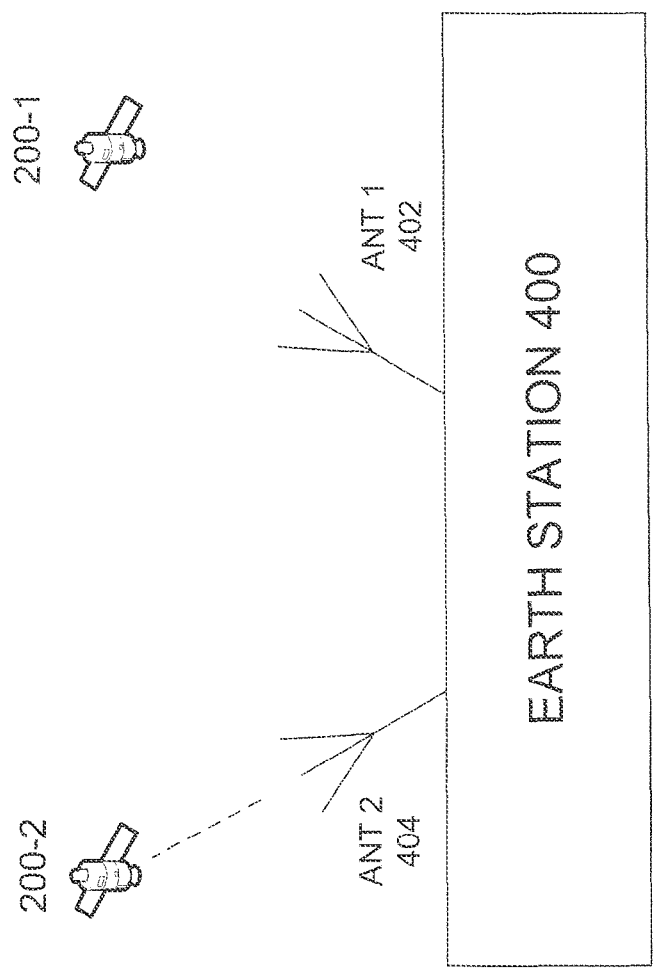

SYSTEM AND METHOD FOR SATELLITE COMMUNICATION

This application is a Continuation of U.S. patent application Ser. No. 12/761,839, filed Apr. 16, 2010, entitled "System and Method for Satellite Communication" which is a Continuation of PCT Application Serial No. PCT/US07/81763, entitled "SYSTEM AND METHOD FOR SATELLITE COMMUNICATION", filed Oct. 18, 2007, now expired, and published as Pub. No. WO 2009/051592 A1 on Apr. 23, 2009 which applications are hereby incorporated herein by reference in their entirety.

BACKGROUND OF THE INVENTION

The present invention relates in general to communication systems and in particular to systems and methods for satellite based communication.

Satellite communication systems provide various benefits to consumers of communication services such as for telephony, internet communications, television communications among others. Various satellite systems are currently available, which are discussed below.

Satellites employing a geostationary (GSO) orbit provide the convenience of having one or more satellites in such a system remain fixed in relation to points on the surface of the earth that they communicate with. However, at GSO altitude, which is about 36,000 kilometers (km), communication latency is about 600 milliseconds (ms). Such latency leads to very slow communication throughput and is particularly ineffective for Internet communication. For example, the main page at "www.cnn.com"® would take about 24 seconds to load with this latency period in effect.

For this reason, satellites employing non-geostationary orbits (NGSOs) such as medium earth orbit (MEO) (between 2000 and 36000 km) and low earth orbit (LEO) (below 2000 km) have in certain cases, been used instead. Existing LEO and MEO satellite systems employ inclined orbits to enable such systems to reach high concentrations of customers located in the northern and southern hemispheres. In such orbits, the satellites move continuously with respect to various earth stations with which they communicate. Moreover, successive satellites in such constellations commonly move along different orbits. Thus, many such systems employ omni-directional antennas at earth-based user terminals to enable ongoing communication to take place as the various satellites in a constellation move through their respective orbits. However, such omni-directional antennas have very low gain, thereby limiting the communication throughput (communication bandwidth) achievable using this approach. One way to compensate for the low gain level of the antennas at the user terminal is to significantly increase the power used for satellite antenna transmission. However, such increased satellite transmission power levels may exceed the power available using current satellite power generation technology, and are therefore impractical.

Moreover, satellites in the LEO and MEO systems may employ mechanical tracking or phased array (electronically steerable) antennas for communication with the earth-based based user terminals to communicate therewith. Such antennas are very expensive, thereby imposing a significant premium on the cost of communication services employing LEO/MEO satellite systems. Accordingly, there is a need in the art for satellite communication systems providing effective communication service at a reduced cost.

SUMMARY OF THE INVENTION

According to one aspect, the invention is directed to a method that may include providing at least one satellite having a plurality of beamformers configured to provide a plurality of respective beams having a plurality of different respective fixed pitch angles about an axis of the satellite; causing the at least one satellite to move around the earth along a non-geostationary orbit; establishing a data communication path between a first of the beamformers on the satellite and a communication target, the data communication path having a satellite end at the first beamformer and an target end at the communication target; shifting the satellite end of the data communication path through a succession of the beamformers as the satellite moves along its orbit; and at least substantially reducing an amount of RF wave energy directed to beamformers of the plurality of beamformers not forming part of the data communication path. Preferably, the plurality of respective beams have a plurality of different respective fixed pitch angles about a lateral axis of the satellite. Preferably, the communication target is a first antenna, at an Earth station, configured to communicate with the satellite along a selected segment of the orbit of the satellite, the first antenna being an Earth end of the data communication path.

Preferably, the communication target is another satellite. Preferably, the at least substantially reducing step comprises: not directing any RF wave energy to beamformers of the plurality of beamformers not forming part of the data communication path. Preferably, the satellite further includes at least one reflector operable to reflect RF wave energy from the plurality of beamformers toward the communication target and to reflect RF wave energy from the communication target toward the plurality of beamformers. Preferably, the orbit is at least substantially equatorial. Preferably, the latitude of the orbit remains between −10 and +10 degrees latitude. Preferably, the latitude of the orbit remains between −5 and +5 degrees latitude. Preferably, the altitude of the satellite orbit is between 600 km and 30,000 km. Preferably, the altitude of the satellite orbit is between 5,000 km and 10,000 km. Preferably, the altitude of the satellite orbit is between 7,000 km and 8,000 km.

Preferably, the method further includes the first antenna at the earth station tracking the satellite using a steering mechanism to cause the first antenna to substantially continuously point toward the satellite. Preferably, the method further includes the first antenna quasi-tracking the satellite by transferring the earth end of the data communication path through a succession of fixed antenna beams, wherein each antenna beam has a substantially fixed orientation with respect to the surface of the Earth. Preferably, the method further includes directing RF wave energy to the beamformer, of the plurality of beamformers, serving as the satellite end of the data communication path. Preferably, the method further includes maintaining the data communication path between the first antenna and the first beamformer over a range of satellite movement corresponding to a communication alignment range between the beam from the first beamformer and the first antenna. Preferably, the method further includes commencing communication between the first antenna and the first beamformer when the first antenna and the beam generated by the first beamformer reach an initial communication alignment boundary during movement of the satellite along its orbit; and concluding communication between the first antenna and the first beamformer when the first antenna and the beam generated by the first beamformer reach a final communication alignment boundary during movement of the satellite along its orbit.

Preferably, communication power between the first antenna, at the earth station, and the first beamformer reaches a peak at centroid-to-centroid alignment between the first antenna and the first beamformer. Preferably, the first antenna communicates with the first beamformer while the communication power along the data communication path therebetween is equal to or greater than one half the peak power. Preferably, the shifting step includes transferring the satellite end of the data communication path from the first beamformer to a second beamformer of the plurality of beamformers once a second antenna at the earth station and a beam from the second beamformer enter into communication alignment range. Preferably, the transferring step includes redirecting RF wave energy, originating from an amplifier on the satellite, from the first beamformer to the second beamformer. Preferably, the redirecting step is performed using a waveguide switch. Preferably, the method includes repeating the steps of transferring and redirecting for the plurality of the beamformers on the satellite so as to maintain operation of the data communication path between the satellite and the earth station throughout the movement of the satellite through the selected segment of the orbit of the satellite.

According to another aspect, the invention is directed to an apparatus that may include a satellite having a plurality of beamformers configured to provide a plurality of respective beams having a plurality of different respective fixed pitch angles about an axis of the satellite; and a controller operable to direct a data communication path through a first beamformer of the plurality of beamformers, wherein the controller is further operable to shift the data communication path through a succession of the beamformers. Preferably, the plurality of different respective fixed pitch angles are about a lateral axis of the satellite. Preferably, the controller is operable to redirect the data communication path from the first beamformer to a second beamformer of the plurality of beamformers upon detecting a decline in communication power along the data communication path. Preferably, the apparatus further includes an amplifier able to supply RF wave energy to one or more of the plurality of beamformers, wherein the controller is operable to select at least one beamformer, of the plurality of beamformers, to direct the RF wave energy to. Preferably, the plurality of beamformers are disposed in an array on the satellite, having a plurality of rows, wherein each beamformer row includes a sequence of beamformers configured to illuminate footprints on the Earth over a range of longitude but with substantially similar latitude; and wherein the plurality of rows are configured to illuminate respective groups of footprints at a plurality of different respective latitudes.

According to yet another aspect, the invention is directed to a method that may include providing a first constellation of satellites within a satellite system; providing at least one additional constellation of satellites to provide a plurality of satellite constellations within the satellite system; enabling adjacent ones of the satellites in the satellite system to communicate with a single earth station; and wherein at least one of the satellites in each constellation has a plurality of beamformers configured to provide a plurality of respective beams having a plurality of different respective fixed pitch angles about a lateral axis of the satellite, and a controller operable to direct a data communication path through a first beamformer of the plurality of beamformers, wherein the controller is further operable to shift the data communication path through a succession of the beamformers. Preferably, the method further includes the adjacent satellites communicating with the earth station employing the same transmission frequency.

Preferably, the method further includes dedicating at least selected ones of the beamformers in the satellite system substantially completely to one of: transmission; and reception. Preferably, the method further includes supplementing the satellite system in a given state with at least one further constellation to provide a modified satellite system without disrupting an operation of the satellite system in the given state. Preferably, the method further includes dedicating at least selected ones of the satellites in the satellite system substantially completely to one of: transmission; and reception.

According to yet another aspect, the invention is directed to a method that may include conducting a data communication session between a first computing entity and a second computing entity over a communication network, wherein at least a portion of the data transferred over the communication network during the data communication session is transmitted over a satellite system, and wherein at least one of the satellites in the satellite system has a plurality of beamformers configured to provide a plurality of respective beams having a plurality of different respective fixed pitch angles about an axis of the satellite; and a controller operable to direct a data communication path through a first beamformer of the plurality of beamformers, and wherein the controller is further operable to shift the data communication path through a succession of the beamformers.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 1 is a block diagram of a communication system 100 including a satellite system in accordance with one or more embodiments of the present invention;

FIG. 1A is a block diagram showing communication apparatus between gateway 102 and subscriber 106 in greater detail;

FIG. 2 is a block diagram of at least a portion the operational components of a satellite in accordance with one or more embodiments of the present invention;

FIG. 5A is a plan view of a plurality of satellites orbiting the earth in an equatorial orbit in accordance with one or more embodiments of the present invention;

FIG. 5B is a schematic view of eight satellites distributed over an equatorial orbit in accordance with one or more embodiments of the present invention;

FIG. 7 is a partially schematic, partially elevational view of a two satellites moving in orbit over an earth station in accordance with one or more embodiments of the present invention;

FIG. 8 is a partially schematic, partially elevational view of two satellites moving in orbit over an earth station in accordance with one or more embodiments of the present invention;

DETAILED DESCRIPTION OF THE PREFERRED EMBODIMENTS

Figure 3:
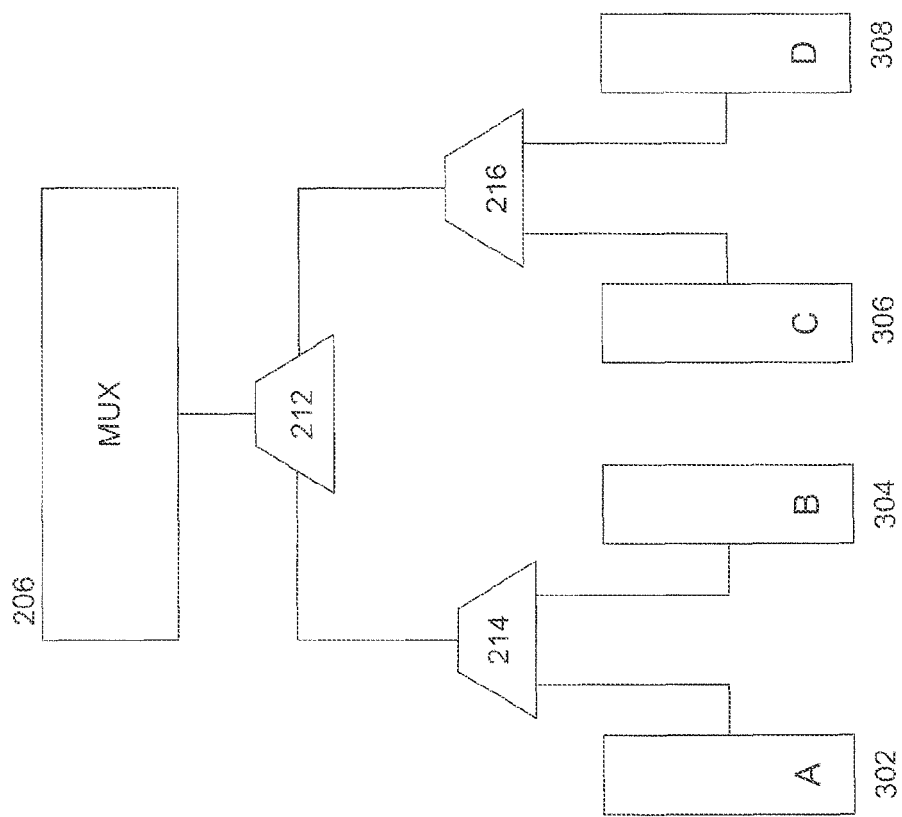
FIG. 3 is a block diagram of at least a portion the operational components of a satellite in accordance with one or more embodiments of the present invention.

Those skilled in the art will appreciate the fact that antennas, which may include beamformers, are reciprocal transducers which exhibit similar properties in both transmission and reception modes. For example, the antenna patterns for both transmission and reception are generally identical and may exhibit approximately the same gain. For convenience of explanation, descriptions are often made in terms of either transmission or reception of signals, on the understanding that the pertinent description applies to the other of the two possible operations. Thus, it is to be understood that the antennas of the different embodiments described herein may pertain to either a transmission or reception mode of operation. Those of skill in the art will also appreciate the fact that the frequencies received and/or transmitted may be varied up or down in accordance with the intended application of the system. Herein, a beamformer is any device suitable for providing a beam suitable for transmitting and/or receiving radio frequency (RF) communication energy. In one embodiment, the communication enabled by the above-described beamformer may occur between a satellite and an Earth station. In other embodiments, such communication may occur between two satellites, or between any two suitable locations at which a beamformer is located.

It is noted here that the parts, linear lengths, and angular distances shown in the figures are not drawn to scale. Moreover, for convenience of illustration, some parts may appear larger in relation to others than would be the case in an actual physical implementation of the various physical objects depicted in the figures. Accordingly, while the figures are provided to aid an understanding of the various embodiments disclosed herein, the present invention is not limited to the relative sizes and orientations of the various parts shown in the figures.

FIG. 1 is a block diagram of a communication system 100 including a satellite system 104 in accordance with one or more embodiments of the present invention. Communication system 100 may include subscribers 106, satellite system 104, communication gateway 102, and communication network 108. The portions of system 100 identified above are described further below.

Communication network 108 may include the Internet. However, communication network 108 may refer to any communications network or system capable of employing a satellite communications system to enable communication between one or more subscribers 106 with a network 108 and/or with each other. Such systems may include, either in place of or in addition to the Internet, telephone systems (landline and/or wireless), radio communications (one-way broadcast and/or two-way radio), television broadcasting, international warning system broadcast (such as for weather emergencies or other event), and/or other communication systems.

Gateway 102 may be an interface between communication network 108 and satellite system 104. Gateway 102 is preferably land-based and preferably provides any needed data communication routing and/or data format conversion needed to enable communication between communication network 108 and satellite system 104. For instance, gateway 102 may include controllers or other control means for controlling the location of a data communication path, such as by selecting one or more satellites from among a plurality of satellites to conduct data communication and/or selecting one or more beamformers (such as, but not limited to feeds) on one satellite or distributed over a plurality of satellites to conduct data communication.

Herein, the terms "satellite system 104" and "satellites 104" are used interchangeably and generally refer to the totality of satellites employed as communication intermediaries in between gateway 102 and subscribers 106. Satellite system 104 may include one or more satellite constellations, wherein each constellation may include one or more satellites. Thus, satellite system 104 may include any number of satellites from one up to any desired number. Each satellite 200 (FIG. 4) of satellite system 104 may transmit data from gateway 102 to one or more specified subscribers 106 and/or to any other satellite 200 within satellite system 104. Conversely, satellite system 104 may transmit data from one or more subscribers 106 to gateway 102.

Subscribers 106 may include one or more subscriber locations which may be located at fixed locations on the earth. Subscriber locations may also be referred to as user terminals. The nature and communication bandwidth needs of subscribers 106 may vary widely. For instance, subscriber 106 may include one or more telephone companies, one or more Internet service providers, one or more Internet cafés, one or more individual communications customers, and/or other form of communication provider such as a cable television provider, or any combination of the foregoing.

FIG. 1A shows the communication between gateway 102 and one exemplary subscriber 106 in greater detail. In this embodiment, Gateway router 102R is preferably part of gateway 102, and subscriber router 106R preferably forms part of subscribers 106. In this embodiment, one modem at each of the gateway router 102R and subscriber 106R may be dedicated to a respective modem. Thus, gateway router 102R may direct data communication through modem A 222, then through satellite A 224, then through modem A 226, and into subscriber router 106R. Likewise, gateway router 102R may direct data communication to modem B 232, then to satellite B 234, in turn to modem B 236, and then to subscriber router 106R.

FIG. 2 is a block diagram of at least a portion of the operational components of a satellite 200 in accordance with one or more embodiments of the present invention. Satellite 200 may include processor 210, dual tracking antenna system 202, amplifier 204, mux (multiplexer) 206, and/or data path control 208. Satellite 200 may further include beamformers 302, 304, 306, and 308 (collectively "beamformers 300").

Dual tracking antenna system 202 may be a communication interface in between gateway 102 (FIG. 1) and the remainder of the communication equipment on satellite 200. Dual tracking system 202 may include two or more mechanically or electronically steerable antennas and/or communication data conversion equipment for interfacing between gateway 102 and communication equipment on satellite 200. The structure and operation of dual tracking system 202 is known in the art. Accordingly, a detailed description of system 202 is not provided herein.

Amplifier 204 is a conventional radio frequency (RF) amplifier as is known in the art, and commonly could be composed of either a traveling wave tube amplification (twta) or solid state power amplifier (sspa). Accordingly, a detailed description of amplifier 204 is not provided herein. Similarly Mux 206 may be a conventional RF multiplexer as is known in the art and is therefore not described further herein.

Data path control 208 may include computing and/or control equipment for selecting one or more beamformers from among beamformers 302, 304, 306, and 308 for use in communication with an earth station antenna, or other satellite. Data path control 208 may be further operable to provide or deny RF (Radio Frequency) power to one or more of beamformers 302, 304, 306, and 308. The beamformers shown in FIG. 2 are further described later in this document and are therefore not further described in this section. Thus, data path control 208 may also serve as a switch for selecting one or more beamformers 300 to direct RF wave energy to. An alternative embodiment for switching among beamformers 300 is described in connection with FIG. 3. In other embodiments, the function of controlling the flow of RF wave energy among the beamformers 300 may be provided by other equipment, instead of or in addition to data path control 208, which other equipment may be located on satellite 200 and/or elsewhere in communication system 100.

Processor 210 may control the flow of data among the beamformers 302, 304, 306, and 308 (where a single beamformer in general may be referred to simply using the numeral "300"). Routers 102R and 106R (FIG. 1A) may control the transfer of communication among successive ones of the beamformers. The routers 102R and 106R may then recognize the shift in data path among the beamformers and make suitable adjustments to their own data paths.

FIG. 3 is a block diagram of a particular embodiment of satellite 200 employing the functions discussed in connection with FIG. 2. The embodiment of FIG. 3 may include mux 206, switches 212, 214, and 216, and/or beamformers 302, 304, 306, and 308. Mux 206 and beamformers 302, 304, 306, and 308 are discussed elsewhere herein and are therefore not discussed further in this section. Switches 212, 214, and 216 represent one possible implementation of data path control 208. Switches 212, 214, and 216 are preferably one-input-two-output microwave switches having suitable control inputs for selection of one of two possible output ports. Suitable control of switches 212, 214, and 216 may enable selection of one or more of beamformers 302, 304, 306, and 308 for use in conducting data communication between satellite 200 and a selected earth station, or other satellite. One commercial switch useable for switches 212, 214, and/or 216 is available from the Bosch® corporation. Suitable control means may be disposed on satellite 200, at gateway 200, and/or other location, for controlling switches 212, 214, and/or 216.

The following is directed to describing various aspects of the orbit of the satellites, the transfer of communication between successive satellites, the transfer of communication between successive beams on one satellite, and movement of an axis of a communication path within the transmission/reception range of a single satellite beamformer's alignment range. Attention is directed first to the characteristics of a satellite orbit in accordance with one or more embodiments of the present invention.

It is noted that existing communication enterprises generally do not deploy satellites in non-geostationary equatorial orbit because the cost of enabling earth stations to communicate with the orbiting satellites is generally very high and the customer base is considered insufficiently large and/or insufficiently well funded to justify the expense. Accordingly, to date, the need for high-speed communication having low latency for equatorial regions has gone unmet. The technology disclosed herein enables satisfying this unsatisfied need and doing so cost effectively by deploying the cost-saving measures disclosed herein.

Figure 4:
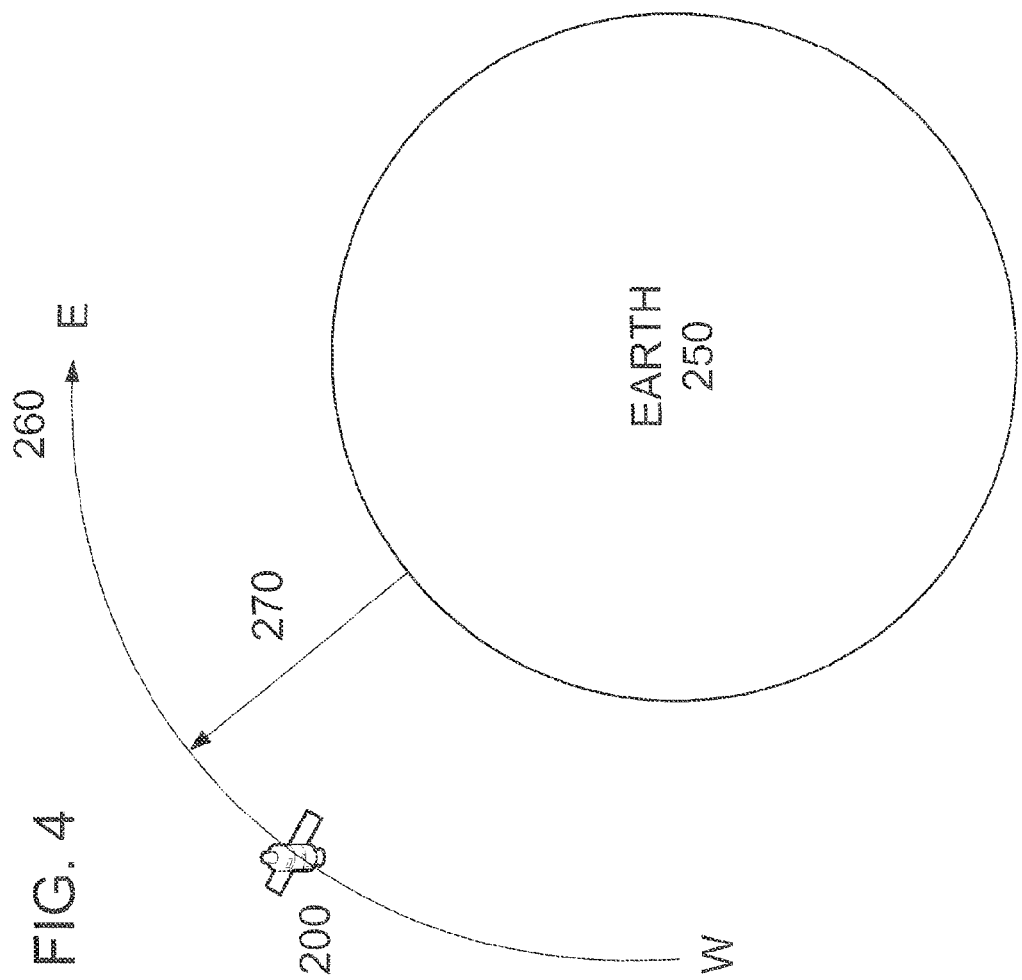
FIG. 4 is a profile view of a satellite orbiting the earth in a non-geostationary orbit in accordance with one or more embodiments of the present invention.

FIG. 4 is a profile view a satellite 200 orbiting the earth 250 in a non-geostationary orbit 260 in accordance with one or more embodiments of the present invention. Satellite 200 preferably orbits the earth in the direction shown at an altitude 270 of about 7500 km. At this altitude, satellite 200 will complete one full orbit of the earth 250 in about 4.5 hours. The direction (from West to East) shown by the arrow on orbit 260 shows both the direction of rotation of the earth 250 and the direction of the movement of satellite 200 around the earth 250.

Only a single satellite 200 is shown for the sake of simplicity in FIG. 4. However, satellite 200 will typically form part of a constellation of satellites. The angular separation between successive satellites may correspond to 360 degrees (which is by definition, the total angular distance of an entire orbit) divided by the number of satellites in the constellation. At least, this is the case where the satellites are equally spaced over the orbit, which may, but need not, be the case. For example, in a constellation having eight satellites in which the satellites 200 are substantially equally spaced about the orbit 260 of the earth 250, the angular separation between successive satellites 200 in orbit 260 would be about 45 degrees.

However, in alternative embodiments, unequal angular spacings may be used between successive satellites in an orbit. Moreover, in still other alternative embodiments, more than one constellation may be employed which have the same or different numbers of satellites, and which may include equal or unequal angular spacings among their respective pluralities of satellites.

Satellite 200 may orbit at an altitude 270 of 7500 km. However, the present invention is not limited to using this orbit, and satellite 200 may orbit at an altitude 270 greater than or less than 7500 km. Satellite 200 may orbit at any non-geostationary altitude suitable for a particular embodiment. For instance, orbit altitude 270 may be between 600 km and 30,000 km; between 5,000 km and 10,000 km; and/or between 7000 km and 8000 km, and all such variations are intended to be included within the scope of the present invention.

FIG. 5A is a plan view of a plurality of satellites 200 orbiting the earth 250 in an equatorial orbit 260 in accordance with one or more embodiments of the present invention. In an embodiment, satellites 200 preferably travel in an orbit 260 that is at least substantially equatorial. In FIG. 5A, orbit 260 is aligned with equator 300. However, in alternative embodiments, orbit 260 could be an inclined orbit that includes latitude variation. In some embodiments, this latitude variation could be within 2 degrees of the equator, within 5 degrees of the equator 300, within 10 degrees of the equator, or other latitude range. In still other alternative embodiments, orbit 260 could reach points more than 10 degrees of latitude away from the equator.

In the embodiment of FIG. 5A, satellite system 104 includes a single constellation of eight satellites 200 which are preferably equally spaced along orbit 260 about the earth 250. Since the horizon-to-horizon view of FIG. 5A only shows one hemisphere of the earth 250, only four of the eight satellites 200 are visible in FIG. 5A. However, it is intended to be understood that four additional satellites 400 are also in orbit above the hemisphere of the earth 250 that is opposite the hemisphere shown in FIG. 3A.

FIG. 5B shows all eight satellites 200 of the embodiment of FIG. 5A shown distributed along orbit 260 (which is preferably equatorial). The eight satellites 200 are shown substantially equally spaced along orbit 260 between two representations of a single point 310 of fixed longitude along orbit 260. This common point 310 may be any fixed location on the earth 250, such as the international date line. Thus, in this embodiment, successive satellites 200 are separated by about 45 degrees of longitude along the equator 300.

Thus, in this embodiment, given the substantially equal angular spacing between successive satellites 200, the angular distance between successive satellites is about 45 degrees. However, as previously stated, in other embodiments, unequal angular spacings among the satellites 200 of a constellation may be employed. Moreover, in still other embodiments, additional constellations having the same or different numbers of satellites may be deployed in addition to, or in place of, the 8-satellite constellation shown in FIG. 5.

Referring to FIG. 5A, while in this embodiment, satellites 200 move in an orbit 260 at least substantially aligned with the equator 300, the antennas on satellites 200 of satellite system 104 are preferably able to transmit to and receive data from a range of latitude in between limit 322 and limit 324. In one embodiment, upper limit 322 is at about 30 degrees latitude north, and limit 324 is at about 30 degrees latitude south. However, in other embodiments, each of the transmission/reception "footprint" limits 322, 324 of satellite system 104 may greater than or less than 30 degrees from the equator 300.

Figure 10:
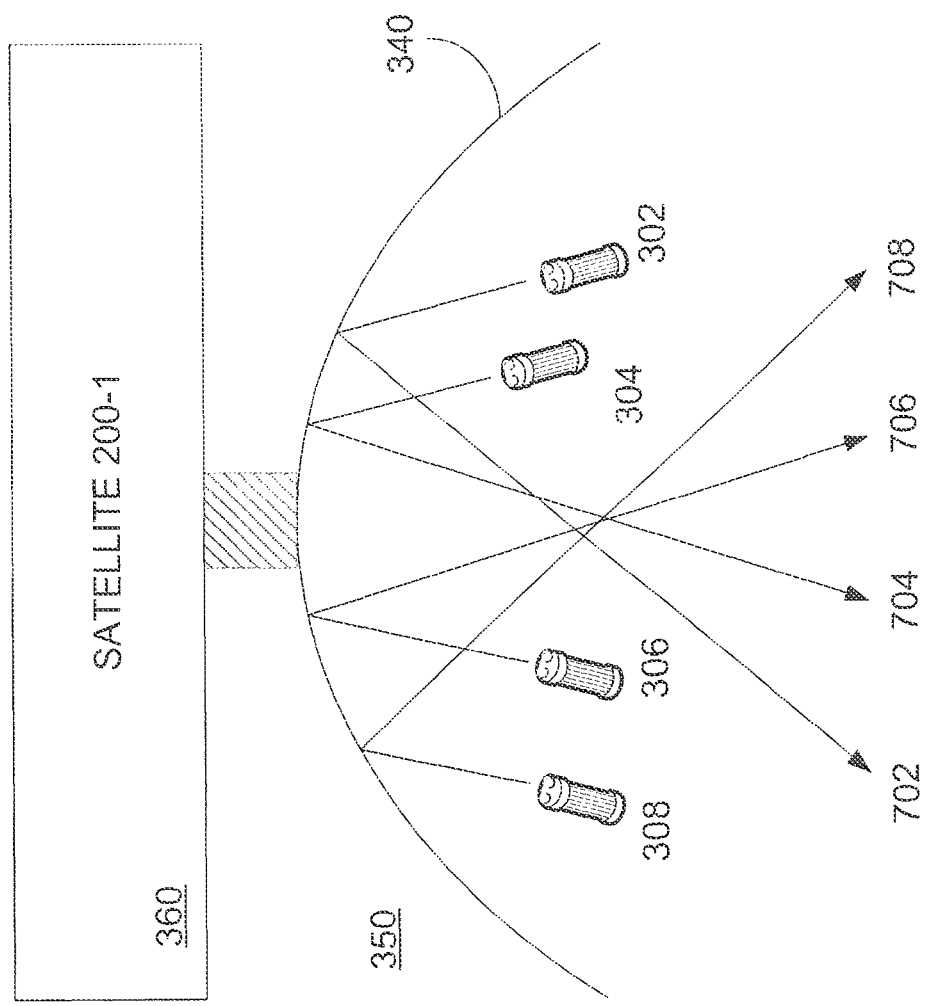
FIG. 10 is a partially schematic and partially elevational view of a satellite having a multi-beam antenna in accordance with one or more embodiments of the present invention.
Figure 11:
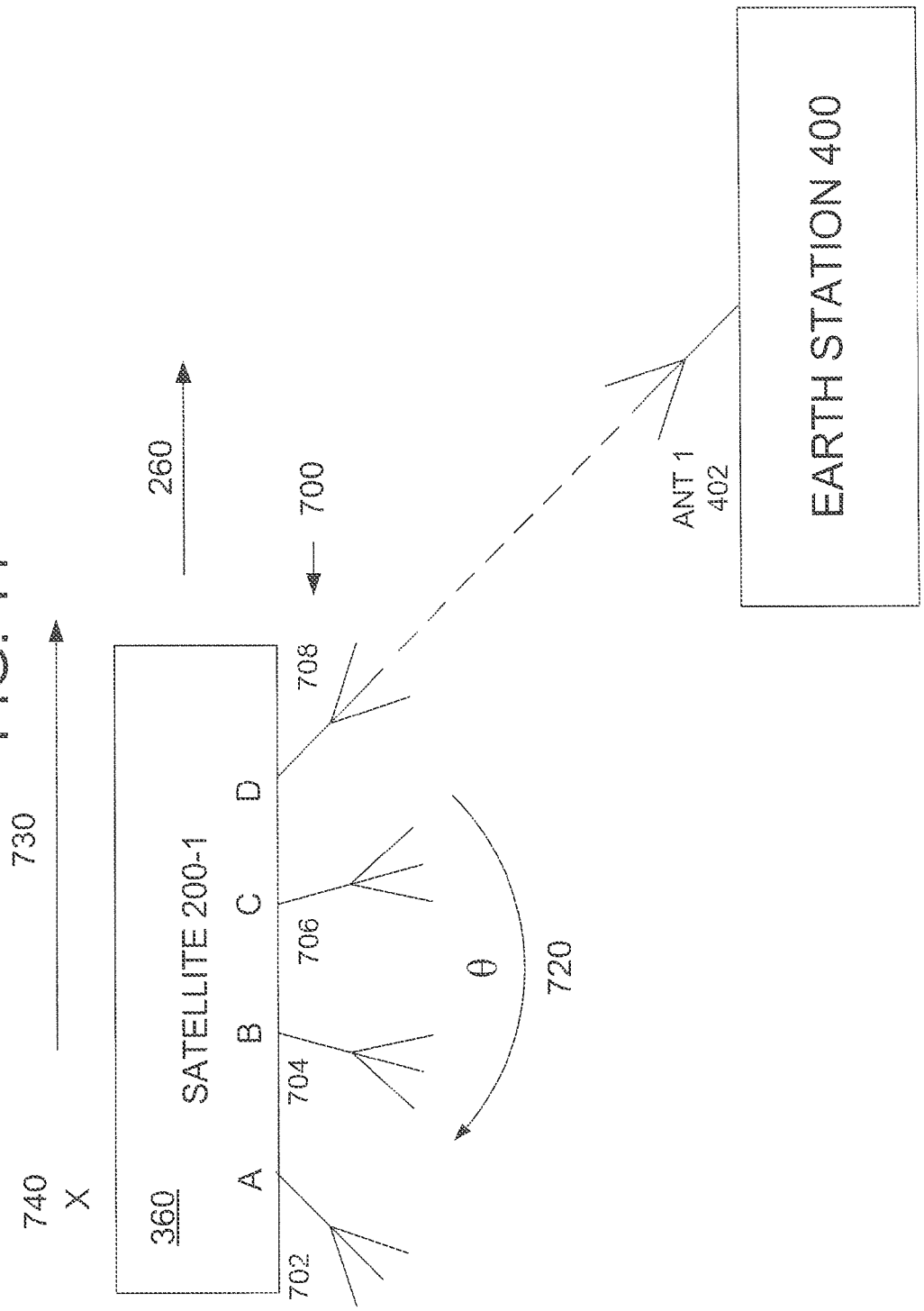
FIG. 11 is a partially schematic and partially elevational view of a satellite having a plurality of beamformers moving in orbit over an earth station in accordance with one or more embodiments of the present invention.
Figure 12:
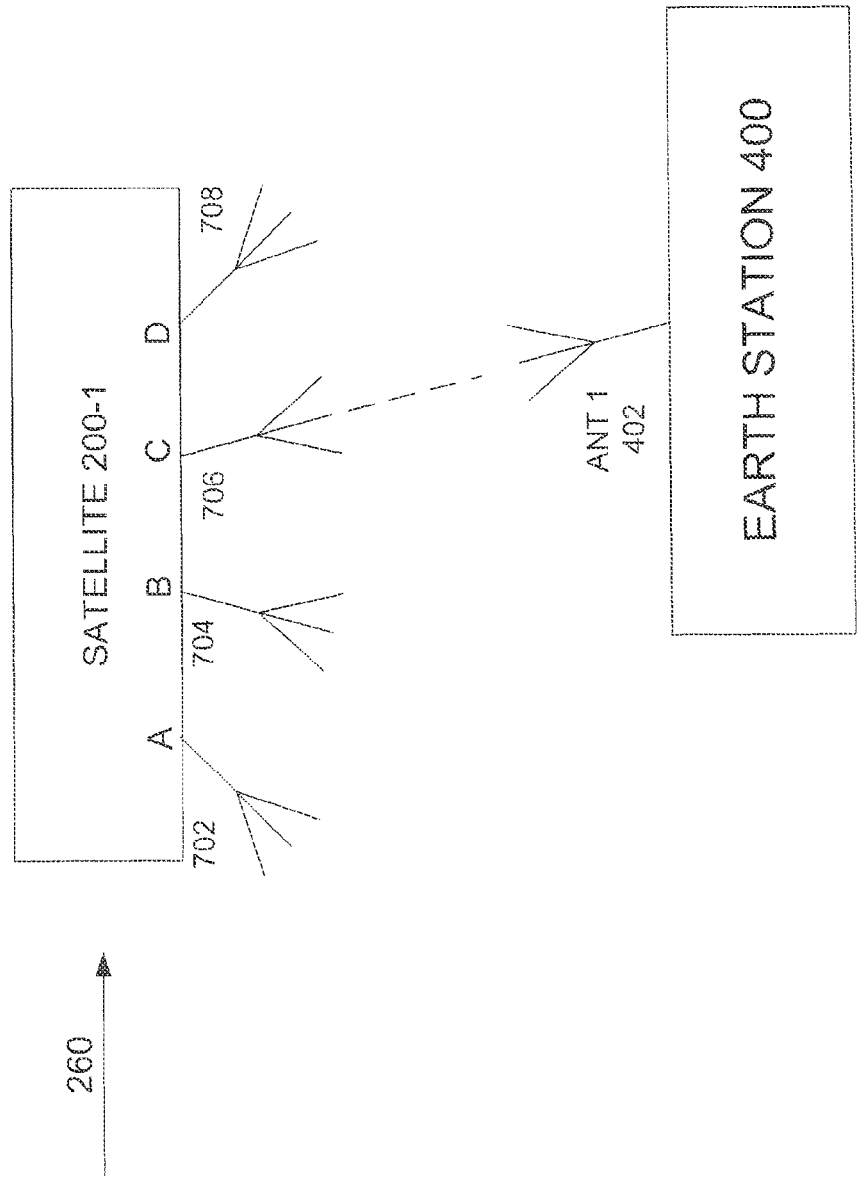
FIGS. 12-14 are partially schematic and partially elevational views of the satellite of FIG. 11 at various stages of advancement along its orbit with respect to the earth station, in accordance with one or more embodiments of the present invention.

The range of latitude over which transmission/reception may be implemented may be enabled by providing one or more beamformers 300 or rows of beamformers 300 directed to communicating within limits 322, 324 by deploying various beamformers 300 on satellite 200-1 (FIG. 10) at a range of different "roll" angles (the angle about the fore-aft axis 730 of satellite 200-1 as shown in FIG. 11) in addition to deploying beamformers 300 at a range of different pitch angles.

In an alternative embodiment, an array of beamformers 300 could be arranged so as to follow the ground path of the satellite over the customers in a walker pattern (inclined orbit) whereby the earth is rotating underneath the moving satellite. In a version of this embodiment using a highly inclined orbit, such as a polar orbit, the satellites could move within a plane intersecting the North and South poles of the Earth, with the Earth's rotation direction being perpendicular to the direction of travel of the satellite. This creates a swirled ground path for the satellite, starting at one longitude at or near the south pole for instance, and eventually ending at a different longitude at or near the north pole. In this embodiment, beamformers 300 may be arranged so as to follow the above-described path and still employ a switching pattern in which a succession of beamformers has RF wave energy directed thereto as the satellite moves along its orbit.

The following is directed to describing the transfer of communication between successive satellites 200 within satellite system 104 and between antennas disposed on an earth station at a subscriber site.

Figure 6:
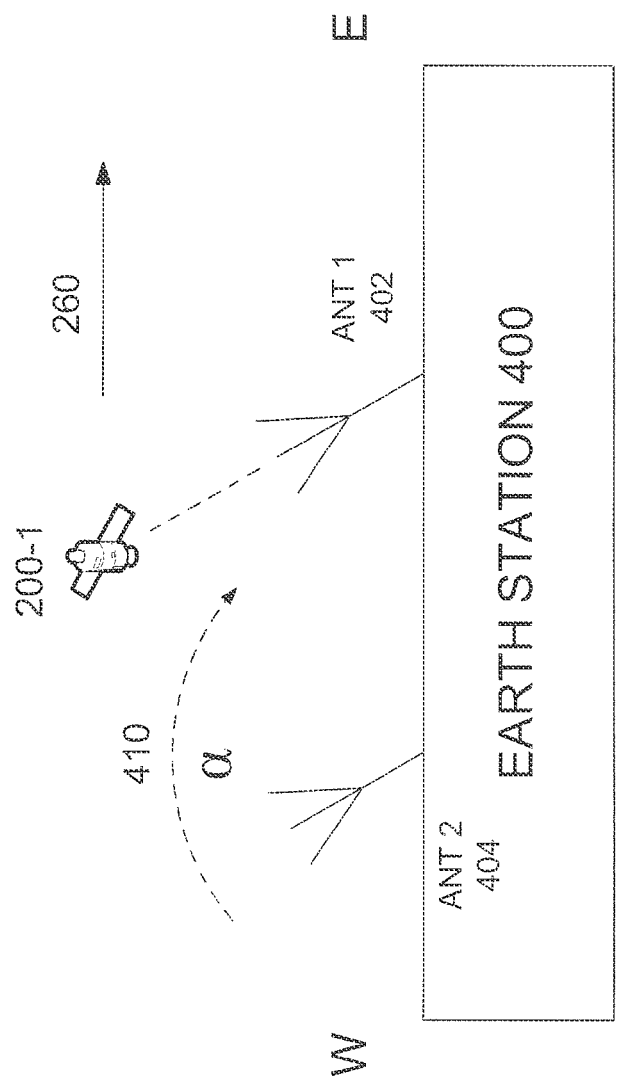
FIG. 6 is a partially schematic, partially elevational view of a satellite moving in orbit over an earth station in accordance with one or more embodiments of the present invention.

FIG. 6 is a partially schematic, partially elevational view of a satellite 200-1 moving in orbit over an earth station 400 in accordance with one or more embodiments of the present invention. Earth station 400 may have antennas 402 and 404 disposed thereon. Earth station 400 may be one of the subscribers 106 discussed in connection with FIG. 1. However, earth station 400 may include one or more such subscribers. Moreover, earth station 400 may form merely one portion of one of subscribers 106. Earth station 400 may include any number of antennas, but is presented in simplified form in FIG. 6 to illustrate a system and method for handing off a data communication path between successive satellites 200-1 and 200-2. FIGS. 6-8 simplify the geometry of the surface of the earth 250 to appear essentially flat. However, the orbit 260 of satellites 200 is preferably unchanged from that discussed in connection with FIGS. 4-5.

The following description may apply to both antennas 402 and 404. However, for the sake of simplicity, the description of the operation antennas 402, 404 will described primarily in connection with antenna 402. Antenna 402 is preferably mounted on earth station 400, or suitable portion thereof, and is preferably steerable along angle α 410 (shown only for antenna 2 404 in FIG. 6, for the sake of clarity and convenience) to track the movement of satellite 200-1 along orbit 260.

Antennas 402 and 404 are preferably steerable along the angle α 410 as shown in FIG. 6 for antenna 404. While the angle α 410 is shown only for antenna 404, due to space limitations in FIG. 6, it will be appreciated that antenna 402 may be articulated (that is, rotated) along a similar angular path, though having a different pivot point. Moreover, the following discussion applies to antenna 402 as well as antenna 404, and to any additional antennas that may be disposed on or in proximity to earth station 400. In one embodiment, angle α 410 may sweep through a plane of constant latitude of the earth and may rotate about an axis running along a line of constant longitude of the earth. Expressed in terms of linear movement, as antenna 404 is rotated clockwise (in the view of FIG. 6), antenna 404 preferably moves from West to East (as shown by the "W" and "E" labels of FIG. 6) in addition to any vertical motion experienced by the antenna 402. By way of further explanation, using the earth as a frame of reference, the axis of the angle α 410 for each of antennas 402 and 404 may be a substantially horizontal line running substantially due north and substantially due south with respect to earth station 400. In the context of FIG. 6, in this embodiment, the axis of the angle α 410 runs into and out of the page. The foregoing description is consistent with the operation of steerable antennas 402 and 404 in conjunction with one or more satellites that follow an equatorial orbit, or an at least substantially equatorial orbit. However, the present invention is not limited to having satellites 200 move along substantially equatorial orbits.

Antennas 402 and 404 are illustrated in schematic form herein for the sake of simplicity. Antenna 402 is preferably a dish antenna that includes at least one beamformer (which may be a conventional feed) and at least one reflector dish (not shown), as is known in the art. Directing a communication "beam" generally involves pointing a transmission beam that starts at a beamformer and reflects off a reflector dish toward a destination. Conversely, a received signal generally arrives along the beam direction and reflects off the reflector dish toward the beamformer. However, for the sake of simplicity herein, antennas 402 and 404 are illustrated as one-piece, Y-shaped antennas that point directly at their respective targets, rather than as beamformer/reflector assemblies. In other embodiments, multi-beam antennas could be used for antennas 402 and/or 404. In this case, either antenna steering mechanisms, or beam-to-beam shifting could be employed to enable antennas 402 and/or 404 to track a satellite. Moreover, it will be understood to those of ordinary skill in the art that any suitable type of antenna could be used for antennas 402 and 404 and that the invention is not limited to the specific embodiments discussed herein.

In alternative embodiments, the angle α 410 of antennas 402 and/or 404 could include a component of latitude variation, if the satellites being tracked thereby travel in orbits that include latitude variation, or if antennas 402 and 404 are located at higher latitudes. If antennas 402 and 404 are located at such higher latitudes (that is, at latitudes significantly above zero degrees), some latitude variation (elevation change) of antennas 402 and 404 may be needed to track satellite orbits due to the curvature of the earth, and typical orbit trajectories, at such non-zero latitudes. The latitude variation of the satellite orbit could be kept within 2 degrees of the equator, and/or within 5 degrees of the equator. In other embodiments, the latitude variation of the satellites could be kept within 10 degrees of the equator. In still other embodiments, the latitude range of the satellites' orbit could be equal to or greater than +/−10 degrees from the equator.

It is noted that considerable efficiency and cost savings may be achieved by enabling an earth based antenna to track a satellite while articulating only a single axis. Moreover, once antennas 402 and 404 are accurately aimed at corresponding beams on satellites 200-1 and 200-2 respectively (and to additional satellites in the constellation that are not shown in FIGS. 6-8), narrowly focused beams may be employed which enable the resulting communication to experience high gain and high data transmission bandwidth. This presents a favorable contrast to systems of the prior art in which omni-directional antennas were used at earth stations, thereby limiting the gain and effective bandwidth of the resulting data communication.

Thus, as discussed above, an earth-based, or earth station based antenna such as antenna 402 may track a satellite using a steering mechanism to cause antenna 402 to adjust its orientation so as to cause antenna 402 to continuously point toward satellite 200-1. In an alternative embodiment however, antenna 402 may omit a steering mechanism and may instead include a plurality of fixed feed horns operable to provide communication beams disposed at a succession of different respective angular positions along angle α 410, and/or along other orientations with respect to the platform, such as earth station 400 on which they are located. In this embodiment, antenna 402 may "quasi-track" satellite 200-1 by transferring its end of a data communication path through a succession of the fixed antenna beams that are disposed a respective succession of orientations, to thereby cause the multi-feed (not shown), multi-beam antenna 402 to implement a series of discrete changes in beam orientation and thus maintain data communication contact with satellite 200-1. A form of quasi-tracking such as that discussed above is discussed in connection with satellite 200-1 in connection with FIGS. 11-15.

In the discussion that follows, the earlier discussed embodiment of satellite system 104 is employed for the sake of discussion. Specifically, satellite system 104 is considered to include one constellation having eight satellites, with successive satellites separated by an angular distance of 45 degrees along orbit 260. An example of tracking a sequence of satellites by having two steerable antennas take turns tracking successive satellites is presented below.

In general, satellites 200 are tracked by one of antennas 402 and 404 upon entering a tracking range of one or more antennas at earth station 400. Antennas 402 and 404 may take turns tracking satellites in the constellation as successive satellites proceed along orbit 260. Thus, in effect, a "relay" system is in effect in which, as one antenna communicates with a satellite, the other of the antennas repositions itself in preparation for tracking the next satellite in the constellation. We now proceed to the discussion of a specific example of the tracking system and method discussed above, as shown in FIGS. 6-8. In the condition shown FIG. 6, antenna 1 402 (which may be referred to simply as "antenna 402") preferably begins communicating with and tracking satellite 200-1 by moving along angle α 410 (clockwise in the view of FIG. 6), as satellite 200-1 moves along orbit 260 (rightward in the view of FIG. 6). Turning to FIG. 7, it may be seen that as satellite 200-1 nears the end of the segment of its orbit 260 during which it communicates with antenna 402, antenna 2 404 (which may be referred to simply as "antenna 404") is positioned so as to be ready to begin communicating with satellite 200-2, once satellite 200-2 reaches a suitable location along orbit 260 within the tracking range of antenna 404. It is noted that in this embodiment, antenna 402 of earth station 400 preferably tracks satellite 200-1 through about 45 degrees of antenna rotation angle α 410. Correspondingly, in this embodiment, during the tracking of satellite 200-1 by antenna 402, satellite 200-1 preferably travels along about 45 degrees of orbit 260.

Continuing with the example with reference to FIG. 8, satellite 200-1 has now moved along orbit 260 beyond the tracking range of antenna 402. And satellite 200-2 is now in communication with antenna 404, as indicated by the dashed line between satellite 200-2 and antenna 404. As described previously in connection with satellite 200-1 and antenna 402, satellite 200-2 will preferably be tracked along a 45 degree segment of orbit 260 by antenna 404. Correspondingly, antenna 404 will itself preferably move about 45 degrees along angle α 410 (FIG. 6) while tracking satellite 200-2. While antenna 404 tracks satellite 200-2, antenna 402 preferably repositions itself (by moving counter-clockwise in the view of FIGS. 4-6) to prepare to communicate with, and track, the next satellite (not shown) in the succession of satellites in the constellation. The data communication path linking satellite system 104 to earth station 400 is preferably transferred from the pairing of antenna 402 and satellite 200-1 to the pairing of antenna 404 and satellite 200-2 as satellite 200-1 moves beyond the tracking range of antenna 402, and as satellite 200-2 enters the tracking range of antenna 404.

Having discussed the transfer of the communication data path for communication system 100 (FIG. 1) between successive satellites, the following discussion focuses in greater detail on the intra-satellite transfer of a data communication path between successive beamformers 300 within a single satellite. The numeral "300" is employed to refer a satellite 200 beamformer in general or to a plurality of beamformers. However, separate reference numerals are used in connection with specific individual beamformers 300. Likewise, the numeral "700" is employed to refer to a beam, or to beams, in general, while separate reference numerals are employed to refer to specific individual beams.

FIGS. 11-15 and the discussion directed thereto describe such intra-satellite data path transfer within a satellite 200-1 having four beamformers 300 and four respective resulting beams 700. However, the concepts presented herein may be readily scaled down or up to apply to satellites having fewer or more than four beamformers.

In connection with this discussion, FIG. 9 shows greater detail in connection with the movement of a communication beam center with respect to a single satellite 200 beam 704 over the course of the movement of satellite 200 through a portion of its orbit corresponding to a period of communication between a single beam 704 and a single specified earth station 400 antenna 402.

In the following, the structure of satellite 200-1 is discussed first, in connection with FIG. 10. After that, an overview is presented of the various pertinent angles and frames of references of the earth station antennas 402, 404, the satellite 200-1, and the moving frame of reference pertinent to the interaction of each beam 700 with each antenna 402 or 404. Thereafter, the detail of the movement of beam 704 with respect to antenna 402 over the alignment range of this single communicator pair (one beam and one earth-based antenna) is discussed. Thereafter, a sequence of intra-satellite data communication path transfers are considered in connection with FIGS. 11-15.

FIG. 11 is a partially schematic and partially elevational view of a satellite 200 having a plurality of beams 702, 704, 706, and 708, and moving in orbit over an earth station 400 in accordance with one or more embodiments of the present invention. FIG. 10 shows one embodiment for implementing the satellite 200-1 having beams 700. Below, the structure of FIG. 10 is described. Thereafter, the operation of satellite 200-1 is described in connection with FIGS. 11-14.

With reference to FIG. 10, satellite 200-1 may include chassis 360 and multi-beam antenna 350 which may include reflector 340, and beamformers 302, 304, 306, and 308 (collectively beamformers 300), which may generate beams 702, 704, 706, and 708, respectively. Elsewhere herein, beams 702, 704, 706, and 708 (collectively beams 700) are schematically illustrated using a Y-shaped antenna structure for the sake of convenience. Thus, beams 700 preferably correspond to data transmission/reception directions. For the sake of convenience, some of the following discussion herein refers to communication occurring "between" a beam 700 and an antenna on earth station 400. It is to be understood that in this context, beam 700 (or a beam having another suitable reference numeral) corresponds to a data communication path, and that the beam 700 is not a structural entity in and of itself. Beamformers 300 may be conventional antenna feeds, but are not limited to this implementation. Beamformers 300 may have positions and orientations that are fixed with respect to reflector 340 and chassis 360 of satellite 200-1. However, in other embodiments, beamformers 300 could be mobile linearly and/or angularly with respect to reflector 340 and/or chassis 360 of satellite 200-1.

In one embodiment, reflector 340 may have a diameter of between 0.3 meters and 1 meter. However, in other embodiments, reflector 340 may have a diameter smaller than 0.3 meters, or greater than 1 meter. While in the embodiment of FIG. 10, one reflector 340 is shown, in other embodiments, two or more reflectors 340 may be employed in antenna 350. Moreover, any number of (that is, one or more) beamformers 300 may used to direct/receive RF wave energy to/from each such reflector 340.

The beams 700 may be generated by the apparatus shown in FIG. 10. However, the present invention is not limited to employing this apparatus. For instance, fewer or more than four beamformers 300 may be employed. Moreover, the relative linear positions and orientations of beamformers 300 may be varied as desired to achieve desired distribution of beam 700 orientations. Various aspects of the use of the multiple beam antenna 350 are discussed below.

As discussed above in relation to FIG. 10, satellite 200-1 may have a plurality of beamformers 300 disposed thereon, which may be operable to generate beams 700. In the embodiments of FIGS. 10-15, four beams 702, 704, 706, 708 are shown, which are also labeled as beams A, B, C, and D, respectively. The beamformers 300 are preferably disposed in a plurality of different fixed orientations with respect to satellite 200-1. This approach is economically effective since the need for highly expensive steerable antennas may be avoided. Moreover, this approach enables communication bandwidth to be concentrated along a relatively narrow and well defined path that is closely aligned with a counterpart antenna (or beamformer) either on earth station 400 or on another satellite. This concentration may be accomplished by directing all or substantially all of the RF wave energy used for transmitting data from, and receiving data at, satellite 200-1 through just one beamformer 300 to produce just one beam 700 at a time. Thus, in this embodiment, beamformers 300 other than the one being used for communication, and therefore forming part of the data communication path, preferably do not have any RF energy directed thereto. However, in alternative embodiments, RF wave energy may be directed through more than one beamformer 300 at a time.

Further, this multiple beamformer 300 approach may enable total power consumption to be reduced to a minimum and may enable the power actually used to be efficiently expended by directing a transmission/reception communication path substantially only to footprints or regions on the earth 250 surface where the energy is being received/transmitted. In contrast, certain prior art transmission/reception systems that lack the ability to direct transmission/reception only where needed, transmit to a large reception footprint on the surface of the earth 250, where only a small fraction of this reception footprint actually includes data reception equipment capable of receiving the transmitted energy. Such prior art approaches thus waste considerable amounts of transmission energy. Accordingly, considerable improvements in power consumption efficiency may be achieved employing the systems and methods disclosed herein.

However, in alternative embodiments, satellite 200-1 may include one or more steerable antennas (not shown) in place of, or in addition to, one or more fixed-orientation beamformers 300. If deployed, a steerable antenna (or plural steerable antennas) on satellite 200-1 may be rotated so as to remain in alignment with one or more antennas of earth station 400 while satellite 200-1 moves along the segment of its orbit over which communication takes place between earth station 400 and satellite 200-1.

In one embodiment, each beamformer 300 may be an individual feed as shown in FIG. 10. However, beamformers 300 are not so limited. In other embodiments, each beamformer 300 may be any device suitable for providing a communication beam.

With reference to FIG. 11, beams 708-702 (D-A) may be oriented at a succession of progressively increasing pitch angles 720 ($\theta$) about a lateral axis 740 of satellite 200 with respect to a forward end of the satellite 200-1. Axis 740 runs into and out of the page in the view of FIG. 11. In general, as stated before, each beam 700 preferably has a fixed orientation with respect to the structure of satellite 200-1. Employing this arrangement, the combination of beams 700 on satellite 200-1 is preferably able to conduct communication with earth station 400 over a significant angular range of orbit 260, without the need to alter the pitch angle of any individual beam 700.

In the above-discussed embodiment, orienting the plurality of beams as described is intended to enable shifting the data communication path from one beam to another to maintain communication with Earth station 400 as satellite 200-1 proceeds along its orbit. Providing beams 700 having different pitch angles 720 about lateral axis 740 is one way to accomplish this objective, since lateral axis 740 is configured to be at least substantially perpendicular to the direction of travel of satellite 200-1. However, the invention is not limited to varying the orientation of the beams 700 about the lateral axis. In other embodiments, beams 700 may be provided that have different angular positions about the lateral axis 740, about the fore-aft axis 730, and/or about the vertical axis (up and down in the views of FIGS. 11-15.

For the purpose of the discussion of FIGS. 11-15, we consider a satellite system 104 including a single constellation having eight satellites 200. Thus, in this embodiment, satellites 200 are preferably located at 45 degree increments throughout orbit 260. As in FIGS. 6-8, the geometric arrangement of the satellite 200-1, its orbit 260, and the earth station 400 is simplified so as to portray substantially linear movement of the satellite 200-1. However, it will be understood that as shown in FIG. 2, satellite 200 moves in an at least substantially circular orbit about the earth 250.

In this embodiment, the range of pitch angle of the beams 700 on satellite 200-1, is also preferably 45 degrees. As previously stated herein, the angles shown in the figures are not drawn to scale. Consistent with this, to more clearly illustrate the change in pitch angles among the beams 700 in FIGS. 11-15, the representation of the pitch angle variation among beams 700 has been exaggerated in FIGS. 11-15. Consequently, the pitch angles of beam 708 with respect to the forward direction of fore-aft axis 730 and of beam 702 with respect to the rearward direction of fore-aft axis 730 are also not drawn to scale in FIGS. 11-15.

In the below discussion, reference is made to fore-aft axis 730 of satellite 200-1 which is shown in FIG. 11, with the arrow (at right) showing the forward direction of this axis. In this embodiment, beam 708 is preferably oriented at a pitch angle $\theta$ of 67.5 degrees with respect to the forward direction of the fore-aft axis 730 of satellite 200-1, the fore-aft axis 730 preferably being substantially aligned with the direction of orbit 260. Correspondingly, beam 702 may be oriented at a pitch angle of 67.5 degrees with respect to the rearward direction of the fore-aft axis 730 of satellite 200-1. In this embodiment, the pitch angles preferably increase in consistent increments in progressing from the most forward oriented beam 708 to the most rearward oriented beam 702. In this embodiment, this increment in pitch is preferably 15 degrees. Thus, in this embodiment, the pitch angles $\theta$ of beams 708, 706, 704, and 702, with respect to the forward direction of fore-aft axis 730, may be 67.5 degrees, 82.5 degrees, 97.5 degrees, and 112.5 degrees respectively.

While one embodiment has been described in detail above, it will be appreciated by those of skill in the art that many variations of the above geometric arrangements are available. First, the number of constellations may be increased to any desired number. Moreover, the number of satellites per constellation may be varied to a number above or below eight. Where satellites are equally distributed within a constellation, an increase in the number of satellites per constellation will operate to decrease the angular distance along orbit 260 between neighboring satellites. Moreover, in other embodiments, the angular spacing between neighboring satellites in a constellation need not be constant, but rather may be varied as desired to suit a particular application. In other embodiments, the number of beamformers (whether individual feeds or other implementation) may be less than or greater than four. Further, the angular spacing between successive pitch angles of the beamformers 300, and the beams 700 resulting therefrom, on any given satellite need not be constant as discussed in connection with FIG. 10, above, but rather, may be varied as desired in accordance with the needs of a particular application. More specifically, in alternative embodiments, the pitch angles of any of beams 700 may have any desired value with respect to the forward direction of fore-aft axis 730 of satellite 200-1. Furthermore, as discussed earlier, beams 700 may be oriented at a range of different "roll" angles (the angle about fore-aft axis 730 of satellite 200-1) to enable satellite 200-1 to communicate with earth stations located at a wide range of latitudes, such as between 30 degrees latitude north and 30 degrees latitude south. Beamformers 300 may be suitably deployed and oriented on satellite 200-1 so as to provide the above-described beams 700 oriented at a range of roll angles.

FIGS. 11-15 show an embodiment in which the linear placement of each beam 700 along the fore-aft axis 730 of satellite 200-1 is correlated to the orientation, specifically the pitch angle $\theta$ 720, thereof. Specifically, in the embodiment of FIG. 11, beam 708 is located closest the front (rightmost end, in the view of FIG. 10) of satellite 200-1 along the linear fore-aft axis 730. And, beam 708 is also the most forward directed of the four illustrated beams. While this arrangement may offer a certain amount of convenience in the design and operation satellite 200-1, the present invention is not limited to this configuration. In other embodiments, beams 700 having any of the pertinent pitch angles 720 may be located at any linear position along the fore-aft dimension (running left to right in FIG. 10) of satellite 200-1. Moreover, beams 700 having any of the pertinent pitch angles 720 may be located anywhere along the lateral axis 740 of satellite 200-1. Furthermore, the plurality of beams 700 need not be arranged along a linear row having a constant position along the lateral axis 740. That is, the various beams 700, with their respective pitch angles, may be located in any position, with respect to the chassis 360 of satellite 200-1, that enables communication between the satellite 200-1 and the earth-station antennas with which satellite 200-1 communicates.

Before discussing the details of the movements of the satellite 200-1 and the various communication components (beamformers and antennas), it is believed beneficial at this stage to introduce the various frames of reference and angular ranges pertinent to enabling communication between satellite 200-1 (and other satellites) and earth station 400.

We begin with the vantage point of earth station 400 and antenna 402 which may be located thereon. The range of rotation over which antenna 402 may be rotated to track a particular satellite 200-1 is a "satellite tracking range." In one or more embodiments, this antenna rotation is intended to track satellite 200-1 over a substantially or even completely equatorial orbit. However, the present invention is not so limited and may be practiced using satellites following any type of orbit, including non-equatorial orbits.

We now turn to the frame of reference of satellite 200-1. Various angular ranges are pertinent from the vantage point of satellite 200-1 which are discussed in turn below. The portion of the orbit 260 of satellite 200-1 over which satellite 200-1 may be tracked by antenna 402 (or other antenna) of earth station 400 may be referred to herein as an earth station communication orbit segment. The described orbit segment may also be the angular range of the orbit of satellite 200-1 over which a data communication path is in effect between satellite 200-1 and antenna 402 (or other antenna) of earth station 400. A subset of the earth station communication orbit segment is the "beam communication orbit segment" which may be the angular range of the satellite 200-1 orbit over which a data communication path is in effect between earth station 400 and a particular beam 700 of satellite 200-1. Attention is now directed to the distribution of beam 700 pitch angles 720 on satellite 200-1. The angular range along pitch angle 720 (FIG. 10) over which the beam 700 pitch angles are distributed may be referred to herein as the "beam orientation range" or, the "beam pitch angle range".

The term "data communication path" is employed herein and is further described in this section. A data communication path may exist between any communicating entities, such as between an earth-based antenna and a satellite, or more specifically between the earth-based antenna and a particular beamformer on the satellite. From the vantage point of any given communicating entity, the communicating entity at the other end of a data communication path, or portion of such path, may be referred to as a communication target. The data communication path may have "ends" for each of the communicating entities. Thus, for example, where a data communication path exists between a satellite and a communication target, this data communication path has a "satellite end" and a "target end". By way of further example, the end of a data communication path located at an Earth-based antenna may be referred to as an "Earth end" or "earth-based antenna end" of the data communication path.

A further frame of reference bears introduction here. While the following is described in terms of beam 704 and antenna 402, as shown in FIG. 9, for the sake of convenience, it will be appreciated that the frame of reference described in connection therewith is applicable to the geometric interaction between any beam 700 of satellite 200-1 and any antenna at any earth station. The pertinent frame of reference may travel with both antenna 402 (or other antenna) and beam 704 (FIG. 9) as antenna 402 rotates along clockwise through α 410 (FIG. 6) and as beam 704 travels with satellite 200-1 along orbit 260. The term "beam-antenna alignment" may refer to the extent of alignment between beam 704 and antenna 402. The range of this alignment angle within which communication may successfully occur between beam 704 and antenna 402 may be referred to herein as the "communication alignment range".

Having described the arrangement of beams 700 on satellite 200-1, and the various pertinent frames of reference, it remains to describe interaction of beams 700 of satellite 200-1 with antenna 402 as satellite 200-1 moves along the segment of orbit 260 over which satellite 200-1 is tracked by antenna 402. However, the sequence of communication activity occurring between a single beam 704 and antenna 402 is considered in connection with FIG. 9, since this interaction is pertinent to all of the communicator pairs (pairing of a particular beam and a particular earth station antenna) shown in FIGS. 11-15.

Figure 9C:
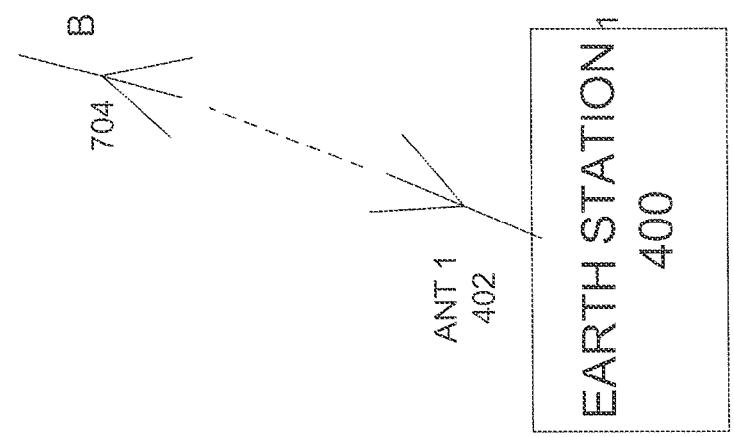
FIGS. 9A-9C are partially schematic and partially elevational views of a satellite beam proceeding along its orbital over an earth station and illustrate the various degrees of alignment between the satellite beam and earth station antenna in accordance with one or more embodiments of the present invention.
Figure 9B:
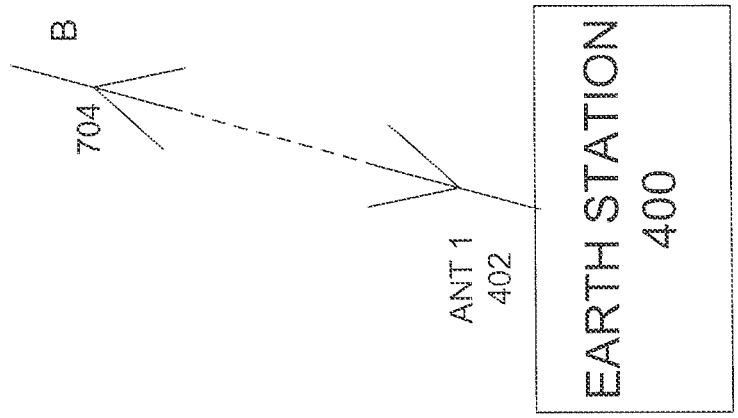
Figure 9A:
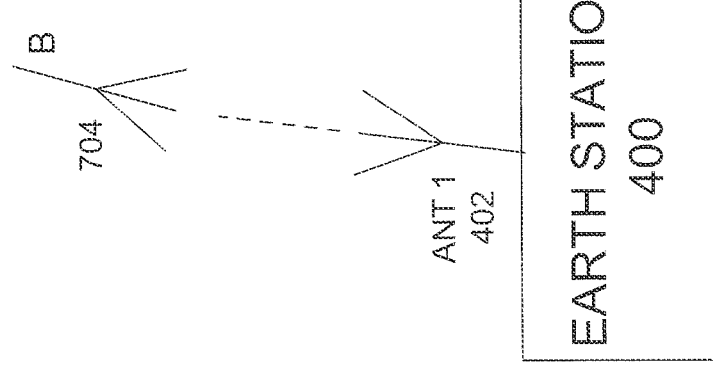

FIG. 9 is a partially schematic and partially elevational view of beam 704 proceeding along orbit 260 over earth station 400 in accordance with one or more embodiments of the present invention. Beam 704 was selected for the sake of convenience. However, it will be appreciated that in this embodiment, the description of the interaction between beam 704 and antenna 402 is applicable to all of beams 700 of satellite 200-1. For the sake of convenience, most of satellite 200-1 is not shown in FIGS. 9A-9C. However, it is to be understood that beam 704, as shown in FIG. 9, is preferably fixed with respect to satellite 200-1, and that satellite 200-1 is proceeding along orbit 260 in transitioning through various stages of orbit advancement shown in FIGS. 9A, 9B, and 9C, respectively. Also, for the sake of convenience, antenna 404 is not shown in FIG. 9.

This section concerns the communication beam power levels, available at various degrees of alignment between beam 704 and antenna 402. Peak communication power preferably occurs at "centroid-to-centroid" alignment (also referred to as "centroid alignment") which is illustrated in FIG. 9B. Lower communication power levels prevail at all other degrees of alignment between beam 704 and antenna 402. Herein, an acceptable range of communication power may prevail within a communication alignment range bounded by an initial communication alignment boundary as shown in FIG. 9A, and a final communication alignment boundary shown in FIG. 9C. In this embodiment, a "boundary communication power level" prevails at the initial and final communication alignment boundaries. In a preferred embodiment, the boundary communication power level prevailing at the communication alignment boundaries (initial and/or final) is equal to about one half the peak communication power that prevails at centroid alignment. However, in alternative embodiments, the ratio of the boundary communication power level to peak communication power level may be less than or greater than one half. The angular range between the satellite 200-1 beamformer and antenna 402 within which communication takes place is referred to herein as the communication alignment range. The magnitude of the communication alignment range (as measured in degrees, radians, or other unit) may have any value, and depends upon various factors such as, but not limited to, the beam widths enabled by of the use of beamformer 302 and the antenna 402, the altitude of orbit 260, and the geometric arrangements of the antenna 402 and the beamformer 302.

In an alternative embodiment, the boundary communication power level may be set to −4 dB (decibels), meaning that the power level of a data communication path or beam is −4 dB (expressed with respect to the peak power level) or higher prior to transmitting or receiving data along the path. The expression −4 dB is further explained here for the sake of clarification. The use of a −4 dB boundary means that the base-10 logarithm of the boundary communication power level divided by the peak power level, all multiplied by 10 should be −4 or higher (meaning more positive). Otherwise stated, in this embodiment, the communication power level of a data path would have to be 39.8% or more of the peak power level for that path, for data communication to be enabled for that path.

At the stage of advancement shown in FIG. 9A, beam 704 has reached a point along orbit 260 at which communication may be initiated between antenna 402 and beam 704. The arrangement shown in FIG. 9A may correspond to an initial alignment boundary for beam 704 and antenna 402. Thus, in this embodiment, the communication power between beam 704 and antenna 402 as shown in FIG. 9A may be at about one half of the peak power that would preferably prevail in the arrangement shown in FIG. 9B.

As satellite 200-1 proceeds along orbit 260, beam 704 and antenna 402 eventually reach the degree of alignment shown in FIG. 9B, which is referred to herein as centroid alignment. This degree of alignment generally provides peak communication power between the beam 704 and antenna 402, or any other communicator pair. Thus, it is noted that as beam 704 advanced from the stage shown in FIG. 9A to that shown in FIG. 9B, the communication power increased from about one half peak power to peak power.

Continuing with the example, beam 704 then continues to advance along orbit 260 to the position shown in FIG. 9C, which corresponds to the final communication alignment boundary (or "final alignment boundary"). At this point, communication power between beam 704 and antenna 402 will generally have returned to about one half peak power. It is noted that throughout the communication alignment range portrayed in FIGS. 9A-9C, the communication power between beam 704 and antenna 402 is preferably sufficient to operate the data communication path between satellite 200-1 and earth station 400 using beam 704 (on satellite 200-1) and antenna 402 (at earth station 400). In this embodiment, the initial communication alignment boundary and the final communication alignment boundary may differ in alignment from the centroid to centroid alignment (of FIG. 9B) in opposite directions, and by angles of substantially equal magnitude.

Preferably, at the stage shown in FIG. 9C, a data path transfer would be initiated that may shift the data communication path from a pairing of beam 704 and antenna 402 to a pairing of beam 702 and antenna 402. This transfer may be implemented by data path control 208 (FIG. 2) or using other suitable control means.

The above discussion describes the variation in alignment between communicators in any given communicator pair (that is, one satellite beamformer and one earth station antenna), the variation in communication power, and the continuity of availability of communication bandwidth during movement of a beam 700 and an antenna 402 along their respective paths throughout a communication alignment range. Accordingly, it remains to describe a series of beam-to-beam transitions, or otherwise stated, beamformer to beamformer transitions, occurring during the travel of a given satellite through a segment of its orbit in which it is tracked by a particular earth station. Accordingly, attention is directed to FIGS. 11-15 for this purpose. It is noted that FIGS. 11-14, for the sake of brevity and simplicity, show centroid-to-centroid alignment between antenna 402 and beams 708, 706, 704, and 702, respectively. However, in a preferred embodiment, each beam 700 of satellite 200-1 advances along orbit 260 with respect to earth station 400 such that the alignment between each beam 700 and antenna 402 goes through all the alignment stages that are shown in FIG. 9, and that were discussed above in connection therewith.

FIG. 11 shows a state of advancement of satellite 200-1 along orbit 260 in which beam 708 is in centroid alignment with antenna 402 of earth station 400. Preferably, communication between beam 708 and antenna 402 is available while beam 708 is within a communication alignment range with antenna 402, which alignment range extends by a finite amount of orbit 260 in both directions along orbit 260 from the position of satellite 200-1 shown in FIG. 10. In this embodiment, each beam 700 may operate for about eight minutes, during which time the satellite 200-1 being tracked may travel over about 200 kilometers (km) of the surface of the Earth.

As satellite 200-1 advances along orbit 260 (rightward in the view of FIG. 10), the communication power between beam 708 and antenna 402 gradually declines to one half peak power, due to increasing misalignment between beam 708 and antenna 402, which may occur at a final communication alignment boundary. Once this "half-power" condition is reached, the satellite 200-1 end of the data communication path between satellite 200-1 and earth station 400 is preferably transferred from beam 708 to beam 706. Thus, data communication is preferably established between beam 706 and antenna 402. Moreover, once communication is established between beam 704 and antenna 402, beam 708 may be discontinued, and communication power from satellite 200-1 may be provided exclusively for beam 706. This approach may beneficially operate to conserve energy, by enabling satellite 200-1 to provide RF wave energy along only one communication path. However, in other embodiments, RF wave energy may be directed along two or more beams 700 at once, if desired, to suit the needs of a particular application.

As the transition between beams 708 and 706 occurs, the alignment between beam 706 and antenna 402 preferably starts at an initial communication alignment boundary. As satellite 200-1 advances further along orbit 260, and as antenna 402 continues to advance along angle α 410 (toward the right in the view of FIGS. 10-13), beam 706 and antenna 402 eventually reach centroid alignment, as shown in FIG. 11, at which point peak communication power may be experienced. As discussed in connection with the communicator pair of beam 708 and antenna 402, beam 706 and antenna 402 eventually reach a final communication alignment boundary. Once again, communication power declines to about one half peak power at this stage.

Upon reaching the half-power condition, a transition of the communication data path from beam 706 to beam 704 is preferably conducted. Thus, beam 704 is preferably enabled by activating beamformer 304 (i.e. providing RF wave energy thereto). Communication is then preferably established between satellite 200-1 and antenna 402 along beam 704.

Figure 13:
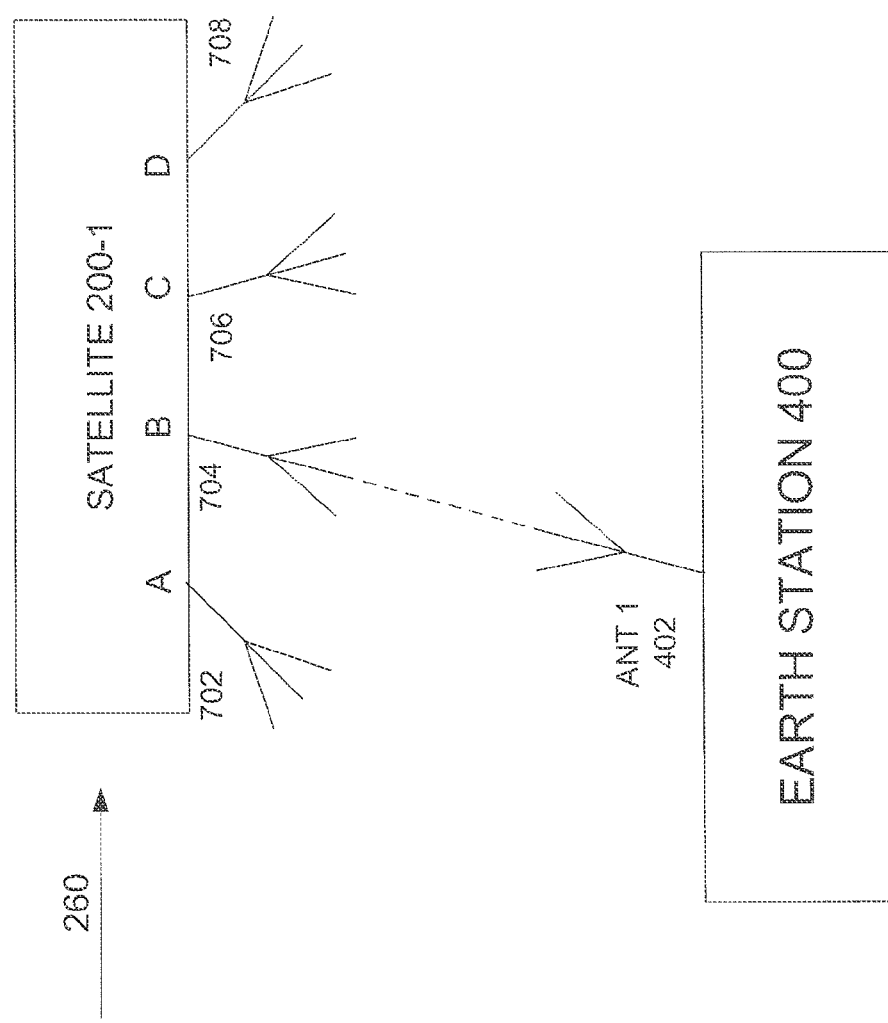

The sequence of events discussed above in connection with beam 706 may be repeated for beam 704. Accordingly, for the sake of brevity, the entire sequence of events discussed above for beam 706 is not repeated in this section. However, in brief, upon initiating communication therebetween, beam 704 and antenna 402 may be at an initial communication alignment boundary. Movement of beam 704 along orbit 260 and of antenna 402 along angle α 410 (see FIG. 6) preferably bring this communicator pair into centroid alignment, as shown in FIG. 13. Further advancement of beam 704 and antenna 402 along their respective paths (orbit 260 for beam 704, and angle α 410 for antenna 402) may bring the alignment between beam 704 and antenna 402 to a final communication alignment boundary.

Upon reaching this final communication alignment boundary, a transition of the communication data path and of beamformer power from beam 704 to beam 702 may be conducted. Thus, communication is then preferably established between satellite 200-1 and antenna 402 along beam 702.

The sequence of events discussed above in connection with beam 704 may be repeated for beam 702. Accordingly, for the sake of brevity, the entire sequence of events discussed above for beam 704 is not repeated in this section. As before, beam 702 and antenna 402 may start off at an initial communication alignment boundary, proceed to centroid alignment, as shown in FIG. 14, and finally, reach a final communication alignment boundary.

Figure 14:
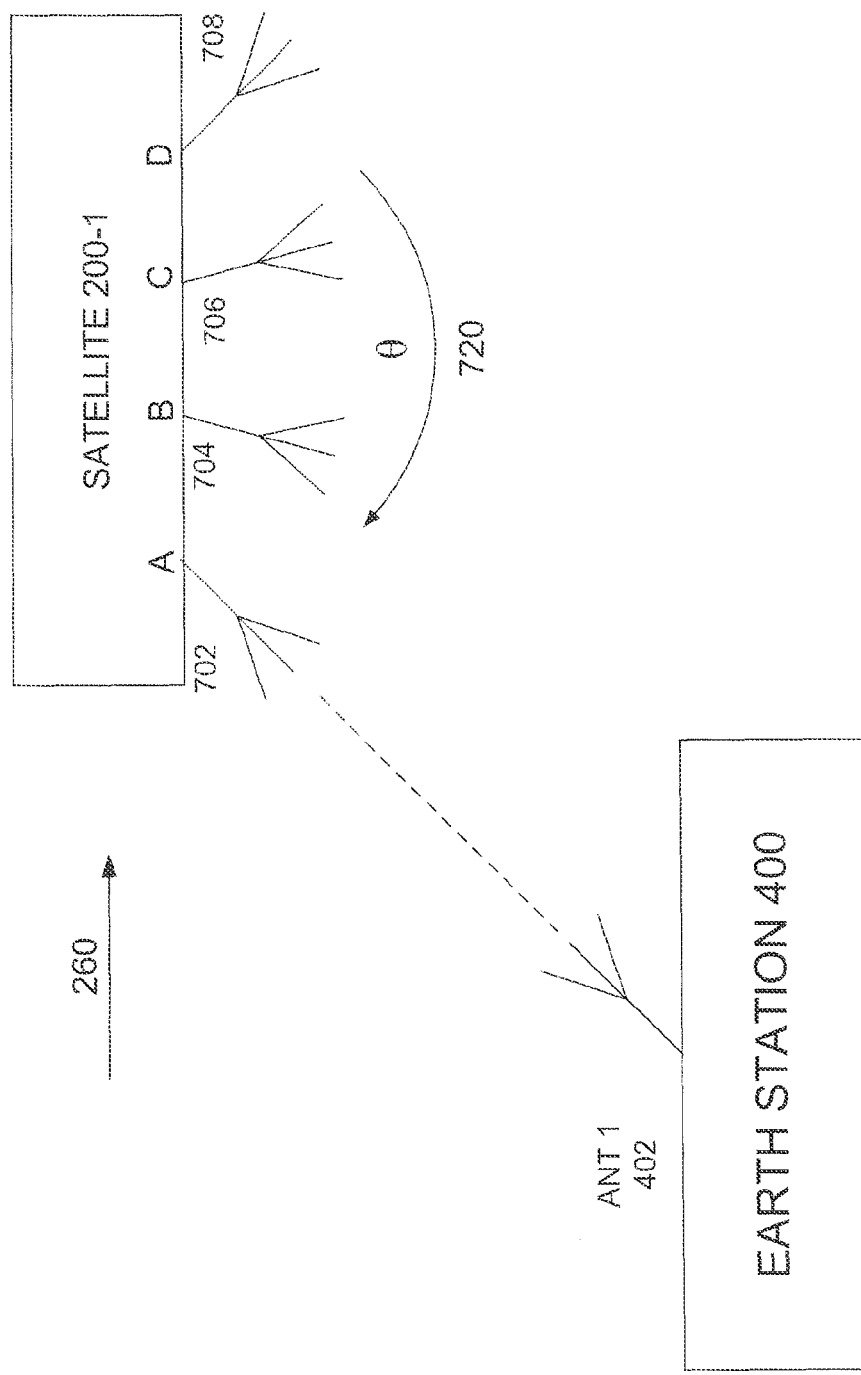
Figure 15:
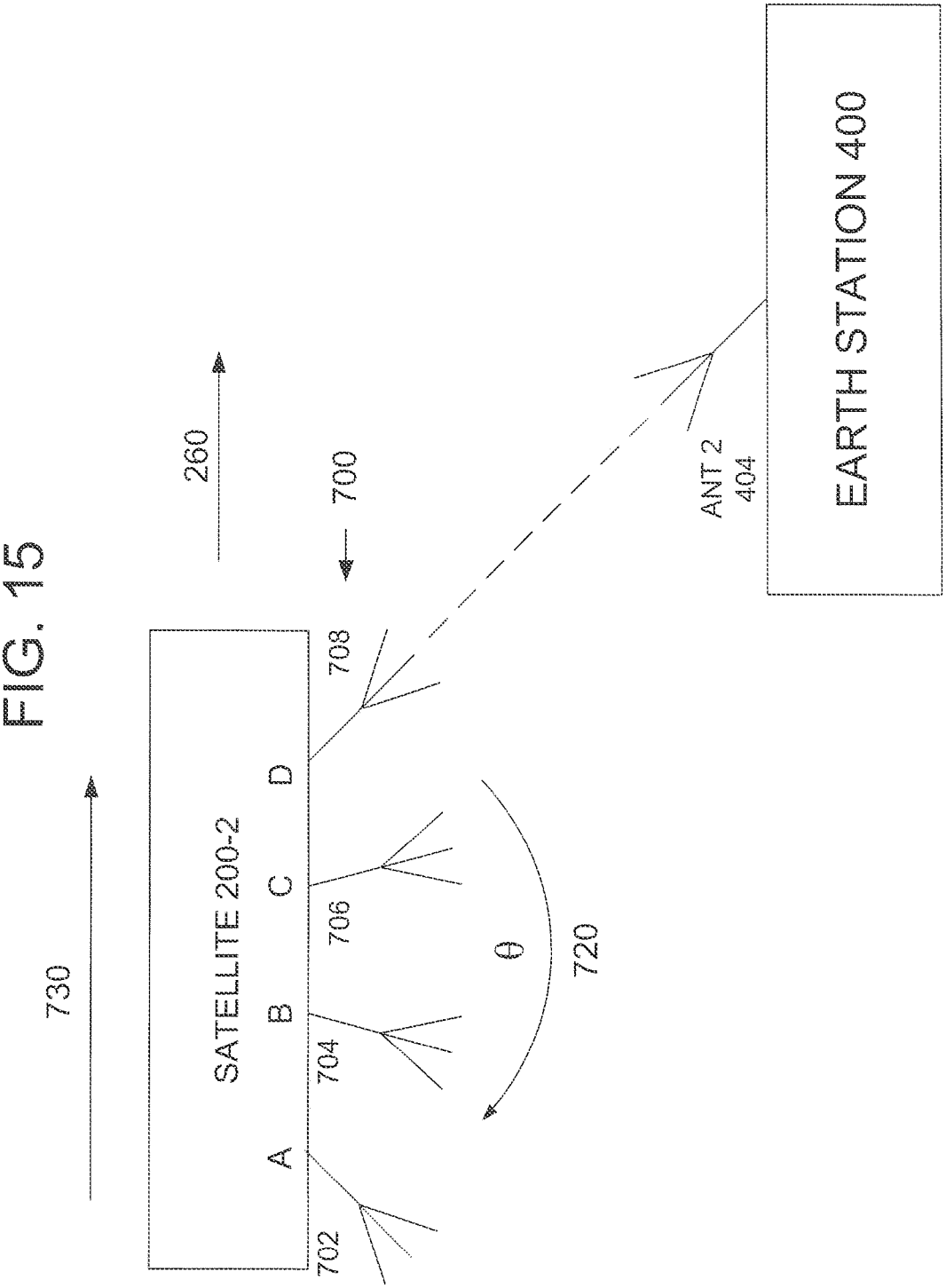
FIG. 15 is a partially schematic and partially elevational view of a satellite proceeding along its orbit over an earth station in accordance with one or more embodiments of the present invention.

Reference is made to FIGS. 14 and 15 in the following. When the final communication alignment boundary has been reached for beam 702 and antenna 402, a transition in the data path and in beamformer power is in order. However, since beam 702 is the last beam on satellite 200-1 with which antenna 402 may communicate as satellite 200-1 proceeds along orbit 260, an inter-satellite transfer of the data path is in order, as was discussed in connection with FIGS. 6-8. Thus, the communication data path may transition from the communicator pair of beam 702 of satellite 200-1 and antenna 402 to the communicator pair of beam 708 of satellite 200-2 and antenna 404 of earth station 400, as shown in FIGS. 14 and 15. As with prior communicator pairs discussed herein, the initial alignment between beam 708 of satellite 200-2 and antenna 404 may be at an initial communication alignment boundary. Once communication is established between beam 708 of satellite 200-2 and antenna 404, beam 702 of satellite 200-1 may be disabled. Thereafter, control over the power and data communication path for satellite 200-2 may be practiced as described above in connection with satellite 200-1.

In an embodiment, the data communication paths may be controlled by each satellite's processor 210 (FIG. 2). A router 102R may control the transition of the data communication path among a succession of beamformers 300 and their respective beams 700. Router 102R, which may be located at a gateway 102 (FIG. 1) may recognize the presence of a first data communication path along a given beam 700, and operate to shift the data communication path to another beam when the given beam 700 fails.

Figure 16:
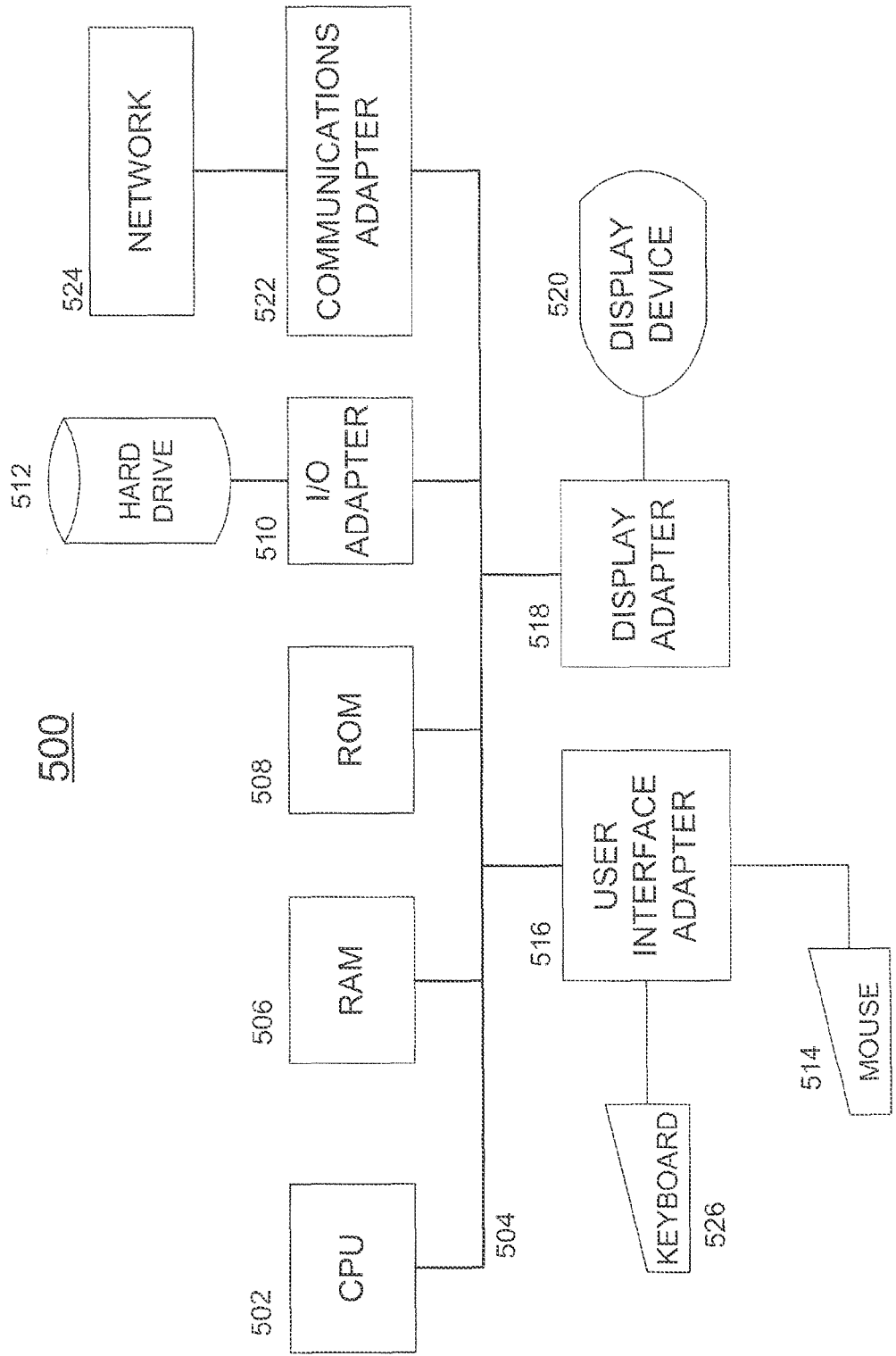
FIG. 16 is a block diagram of a computer system useable in cooperation with one or more embodiments of the present invention.

FIG. 16 is a block diagram of a computing system 500 adaptable for use with one or more embodiments of the present invention. For example one or more portions of computing system 500 may be useable to perform the functions of data path control 208 of FIG. 2, of gateway 102 of FIG. 1, of processor 210 of FIG. 2, and/or of one or more processing entities within communication network 100 of FIG. 1.

In one or more embodiments, central processing unit (CPU) 502 may be coupled to bus 504. In addition, bus 504 may be coupled to random access memory (RAM) 506, read only memory (ROM) 508, input/output (I/O) adapter 510, communications adapter 522, user interface adapter 506, and display adapter 518.

In one or more embodiments, RAM 506 and/or ROM 508 may hold user data, system data, and/or programs. I/O adapter 510 may connect storage devices, such as hard drive 512, a CD-ROM (not shown), or other mass storage device to computing system 500. Communications adapter 522 may couple computing system 500 to a local, wide-area, or Internet network 524. User interface adapter 516 may couple user input devices, such as keyboard 526 and/or pointing device 514, to computing system 500. Moreover, display adapter 518 may be driven by CPU 502 to control the display on display device 520. CPU 502 may be any general purpose CPU.

In this description, the term beamformer refers to a "feed", or otherwise stated "feed horn", or other passive, open-ended wave guide operable to provide and/or receive an individual satellite communication beam. Also herein, the term "beam" generally corresponds to a beam emanating from, or arriving at, a feed or feed horn.

Figure 17:
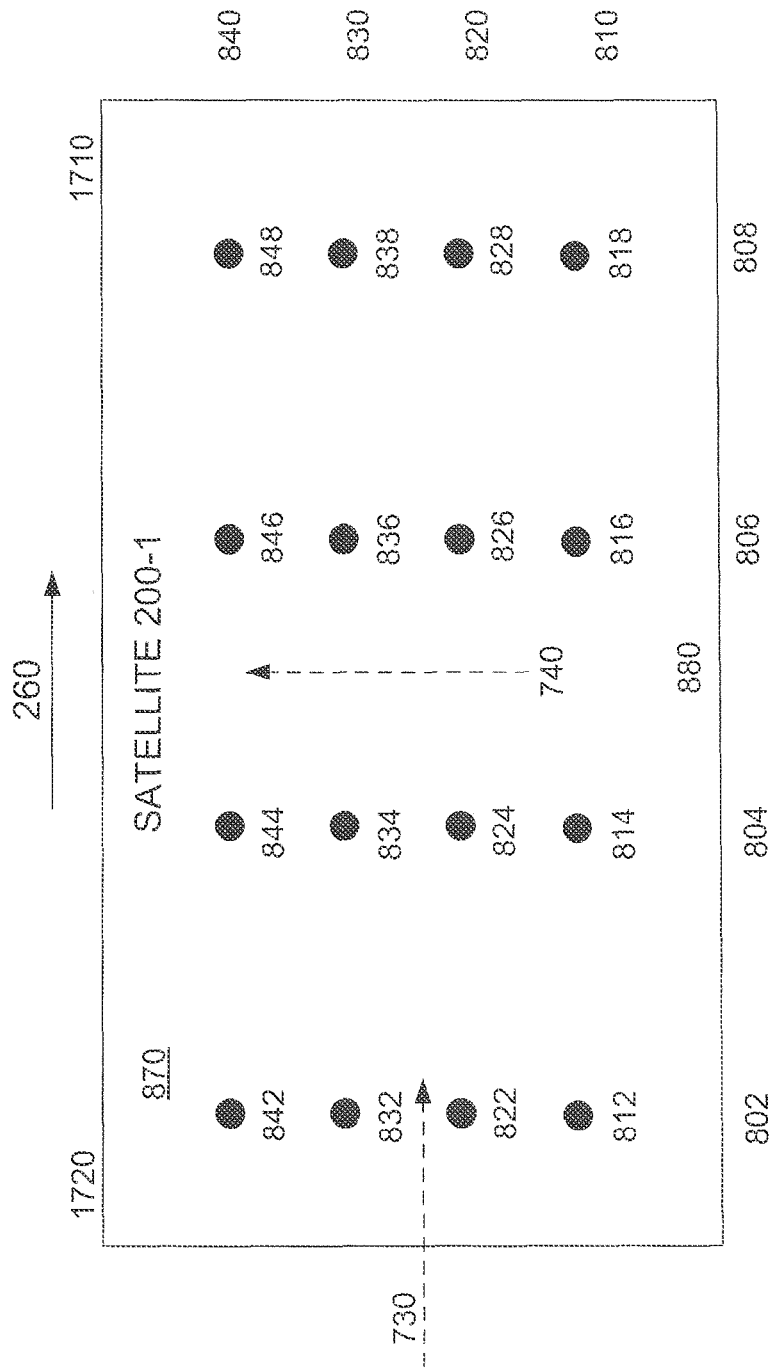
FIG. 17 is a schematic plan view of a satellite having an array of beams in accordance with one or more embodiments of the present invention.

FIG. 17 is a schematic plan view of a satellite 200-1 having an array 870 of beams 800 in accordance with one or more embodiments of the present invention. While the individual beams are individually numbered, an individual beam may, in general, be referred to with the reference numeral 800. Likewise the beams may be referred to collectively using the reference numeral 800. In this embodiment, satellite 200-1 may provide an array 870 of beams 800 which may form a grid. The array 870 preferably includes a plurality of rows and columns of beams over a range of pitch angles 720 (see FIG. 10) about lateral axis 740 and roll angles 750 about fore-aft axis 730 of satellite 200-1.

The beams 800 referred to in this section may be provided by providing an antenna 880 including a reflector dish and suitably locating and orienting a plurality of feeds or feed horns with respect to a reflector dish (not shown). Thus, antenna 880 is effectively a modified version of antenna 350 that includes a grid of feeds corresponding to the grid of respective beams 800 represented in FIG. 17. In a preferred embodiment, each beam 800 is associated with a respective feed "800f". Thus, for the sake of reference herein, beam 812 is provided by 812f, beam 814 by feed 814f, and so forth. For the sake of brevity and convenience in illustrating the inventive concepts disclosed herein, the feeds and reflector suitable for producing beams 800 are not illustrated herein.

Beam array 870 may include rows 810, 820, 830, and 840 and columns 802, 804, 806, and 808. Row 810 may include beams 812, 814, 816, and 818; row 820 may include beams 822, 824, 826, and 828, row 830 may include beams 832, 834, 836, and 838, and row 840 may include beams 842, 844, 846, and 848. Columns 802, 804, 806, and 808 may include respective sets of four beams with reference numerals ending in "2", "4", "6", and "8", respectively, as shown in FIG. 17. While the embodiment of FIG. 17 shows an array 870 of beams 800 having a 4×4 (rows×columns) arrangement, the present invention may include satellites having any number of rows and/or any number of columns, such numbers being less than or greater than four. In the embodiment of FIG. 17, the rows and columns of beams 800 of array 870 are shown positioned in substantially straight lines. However, the invention is not so limited. The beams 800, and the feeds 800*f* (not shown) providing such beams, may be arranged in any suitable configuration that is operable to provide the distribution of beams over the pertinent angular ranges.

Beams 812, 814, 816, and 818 may be aligned within row 810 and may be oriented at substantially the same roll angle 750 (FIG. 18), that is, the angle about fore-aft axis 730 of satellite 200-1. However, beams 812, 814, 816, and 818 are preferably oriented at a plurality of different pitch angles about lateral axis 740 of satellite 200-1. The provision of beams at a plurality of different pitch angles is shown in FIGS. 11-15 and discussed in connection therewith. In brief, the succession of beam pitch angles within beam row 810 may enable satellite 200-1 to conduct piece-wise tracking, or otherwise stated, quasi-tracking of an earth-based antenna (antenna 402 in FIG. 11) while avoiding the expense of deploying a steerable antenna and while providing better gain than an omni-directional antenna. The sequence of beams used for communicating with an earth-based antenna proceed from the front 1710 to the rear 1720 of satellite 200-1, as satellite 200-1 proceeds along its orbit 260. However, the present invention is not limited to employing this sequence of beams.

The embodiment of FIG. 17 expands on the concepts presented earlier by providing a plurality of rows oriented at different roll angles 750 (FIG. 18) to enable communication by satellite 200-1 with earth stations at a range of latitudes on the surface of the earth. A latitude range of between +30 degrees latitude and −30 degrees latitude was discussed in connection with FIG. 5A. However, latitude ranges having northern latitude limits more than or less than 30 degrees from the equator may be implemented. Likewise latitude ranges having southern latitude limits more than or less than 30 degrees from the equator may be implemented.

Figure 18:
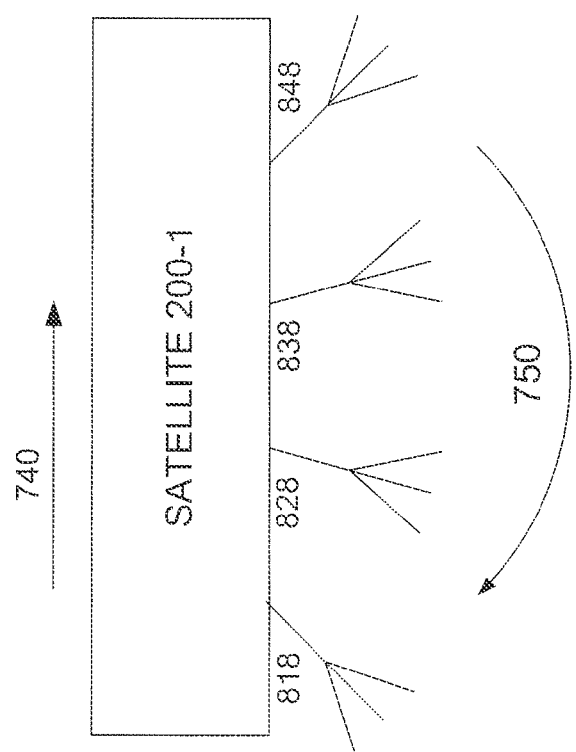
FIG. 18 is a partially schematic and partially elevational view of the satellite of FIG. 17 showing a front column of beams emerging from the satellite, in accordance with one or more embodiments of the present invention.

FIG. 18 is a view of the front 1710 of satellite 200-1 which only shows the front-most column 808 of beams 800. Beam column 808 preferably includes beams 818, 828, 838, and 848, which beams may be distributed over a desired angular range of roll angle 750 of satellite 200-1. The roll angle of each beam row of beam array 870 is preferably fixed and is preferably operable to communicate with an earth station antenna located at a particular earth longitude.

The embodiment of FIGS. 17-18 is preferably operable to enable communication between satellite 200-1 and earth station antennas located at plurality of different latitudes. Preferably, for communication with antennas at each such latitude, satellite 200-1 includes a given row of beams oriented at a roll angle 750 suitable for communication therewith. Moreover, the variation of pitch angle 720 (FIG. 10) among the beams included in the given row preferably enables practicing the piece-wise steering or quasi-steering discussed in connection with FIGS. 11-15, thereby enabling high-gain and cost effective communication to occur between satellite 200-1 and the earth station at that particular latitude.

While the embodiment of FIGS. 17-18 is directed to a satellite 200-1 in which all the beams 800 within a single row have the same roll angle 750 and are therefore configured to point to the same latitude on the surface of the earth, the present invention is not limited to this embodiment. Instead, the beams 800 within a given beam row may be oriented at a range of different roll angles 750, if desirable for a particular embodiment.

Figure 19:
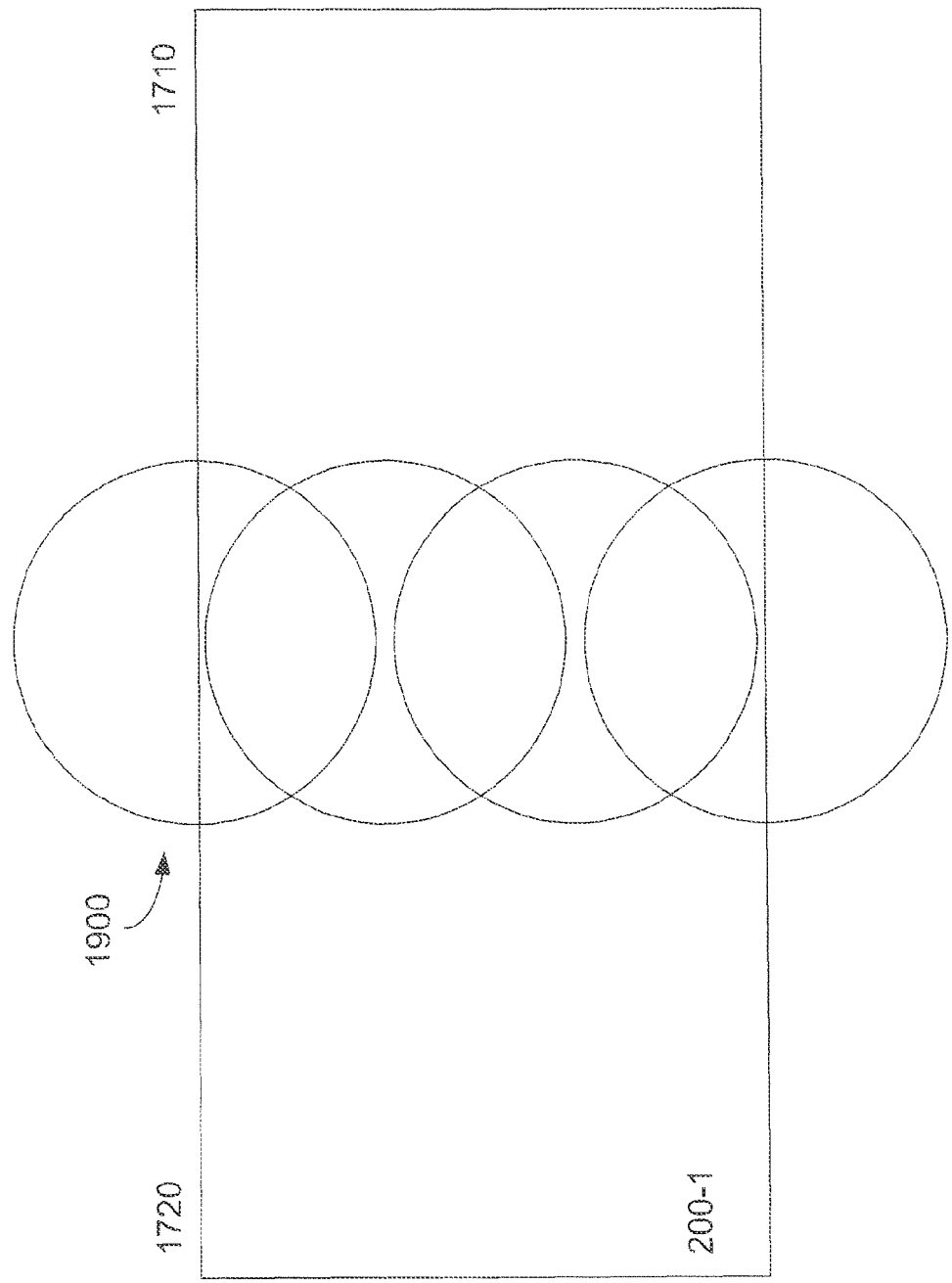
FIG. 19 depicts an array of footprints arising from the beams within the respective beam rows of the satellite of FIG. 17, in accordance with one or more embodiments of the present invention.

FIG. 19 shows a plurality of footprints 1900 representing communication regions for the respective beams 800 on satellite 200-1. In the foreground, satellite 200-1 is shown, which may include front end 1710 and rear end 1720. Footprints 1900 correspond to regions on the surface of the earth distributed over a range of latitude. Preferably, each beam row of beam array 870 is operable to communicate with a respective one of the footprints 1900. It is noted that the footprints 1900 of FIG. 19 are not drawn to any particular scale, and that the rows of beams 800 of satellite 200-1 may be configured to communicate with regions on the surface of the earth of any desired size and/or at any desired latitude.

Figure 20:
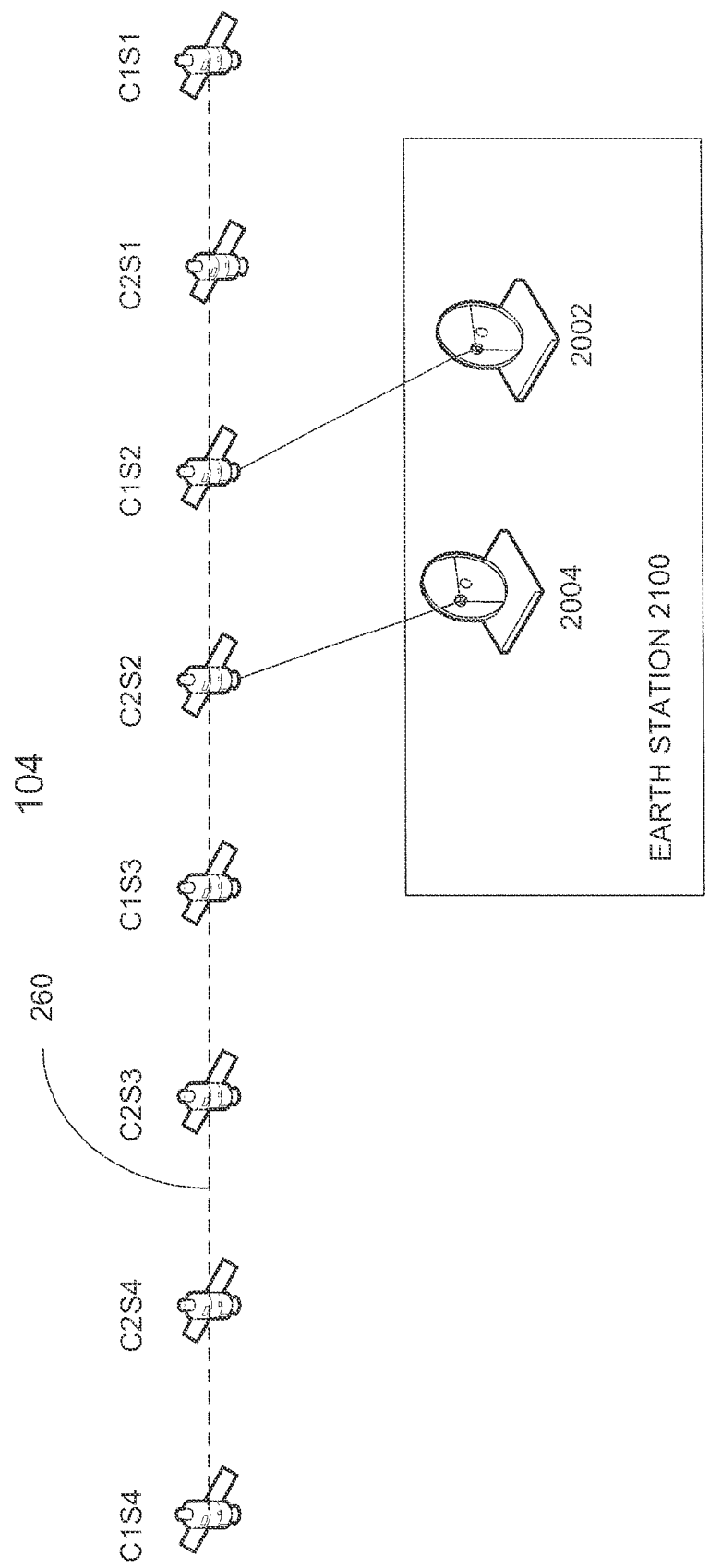
FIG. 20 is a schematic representation of portions of two constellations of satellites moving in orbit around the earth with respect to an earth station in accordance with one or more embodiments of the present invention.

FIG. 20 is a schematic representation of portions of two constellations C1, C2 of satellites moving in orbit around the earth with respect to an earth station 2100 in accordance with one or more embodiments of the present invention. For the sake of convenience, the embodiments discussed earlier in this document were directed to satellite systems 104 including a single constellation including eight satellites. In this section, the effects of supplementing satellite system 104 to include at least one additional constellation are considered.

Figure 21:
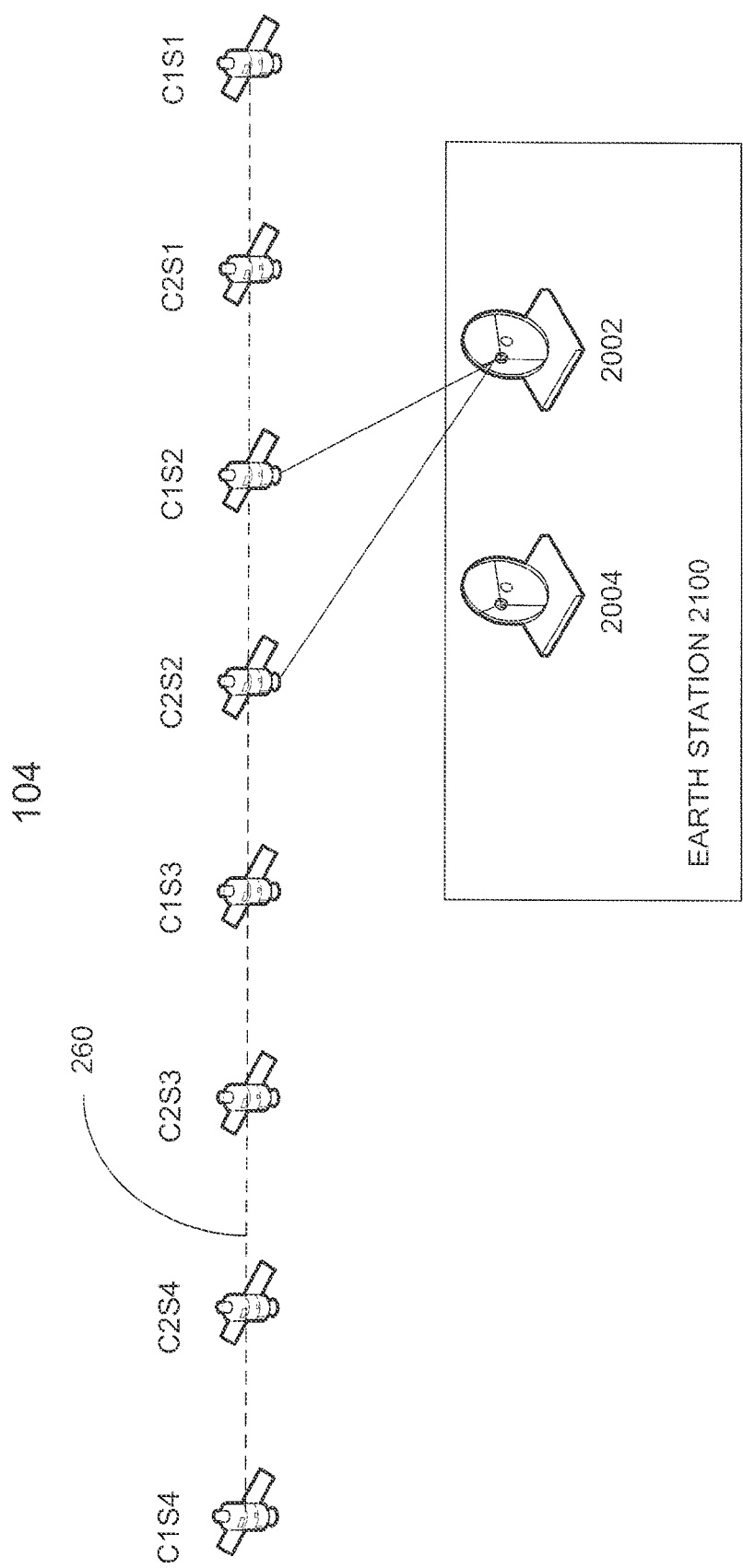
FIG. 21 is a schematic representation of portions of two constellations of satellites moving in orbit around the earth with respect to an earth station in accordance with one or more embodiments of the present invention.

In one embodiment, satellite system 104 may include two constellations C1, C2 which may each include eight satellites. Thus, constellation C1 may include satellites numbered from C1S1 to C1S8, and constellation C2 may include satellites numbered from C2S1 to C2S8. For the sake of convenience of illustration, only four satellites from each of constellations C1 and C2 are shown in FIGS. 20-21. In the embodiment of FIG. 20, the satellites of constellations C1 and C2 are preferably equally spaced along their common orbit 260. Thus, with 16 satellites equally spaced about orbit 260, adjacent satellites are preferably separated by an angular distance of about 22.5 degrees of the 360 degree angular range of orbit 260. However, in alternative embodiments, each constellation may include fewer or more than eight satellites. Moreover, in alternative embodiments, the satellites of the second constellation C2 need not be located so as to provide consistent angular spacings between adjacent satellites throughout satellite system 104.

In the embodiments shown in FIGS. 20-21, portions of two constellations C1, C2 are shown. However, it will be appreciated by those of skill in the art that any number of constellations may be added to an initial or original constellation of satellite system 104. Preferably, satellite system 104 may be supplemented by one or more additional constellations without disrupting the operation of any of the satellites already present in satellite system 104. The addition of constellations to satellite system 104 is preferably operable to add communication bandwidth and flexibility in allocating such bandwidth, among other benefits. Some of the benefits provided by the addition of constellations are discussed below, followed by a discussion of some specific benefits shown in FIGS. 20-21.

In one embodiment, the benefits afforded by the provision of additional constellations may include, but are not limited to, the following. A general increase in communication bandwidth may be provided. Improvements in communication redundancy (that is, the ability to continue service in the event of one satellite failing to operate) may be provided. Where desired, the segregation of communication activity into one-directional communication may be provided. More specifically, a first group of satellites may be dedicated only to transmitting information from satellite system 104 to one or more earth stations. Conversely, another group of satellites may be dedicated only to receiving information at satellite system 104 from one or more earth stations.

In some embodiments, the total communication bandwidth of satellite system 104 may be flexibly allocated among the various satellites for greater efficiency. For example, where helpful, a disproportionate share of the bandwidth of satellite system 104 could be concentrated among satellites present over a region having a large number of customers and/or over customers having high bandwidth requirements. At the same time, the communication bandwidth directed to satellites over customers having low bandwidth requirements may be suitably reduced. Moreover, satellites present over the oceans and/or land having no customers could be shut down partially or completely, thereby conserving power, and freeing up satellite-system 104 bandwidth for use by other satellites. Further, in this embodiment, the flexible allocation of bandwidth may be extended still further to include concentrating more bandwidth in selected beams of a particular satellite that are pointed toward high-bandwidth customer areas, than in beams pointing to less demanding customer sites. A selection of the above-described benefits enabled by the provision of additional constellations are illustrated in FIGS. 20-21. However, the present invention is not limited to the specific embodiments shown in FIGS. 20-21.

FIG. 20 shows an embodiment of satellite system 104 that includes two constellations C1, C2, each constellation having eight satellites, although only four satellites of each constellation are shown. Thus, among the satellites shown in FIG. 20, constellation C1 includes C1S1, C1S2, C1S3, and C1S4, and constellation C2 includes C2S1, C2S2, C2S3, and C2S4. It is noted that the other four satellites of each constellation are not shown for the sake of convenience of illustration. The structure and function of each of the satellites shown in FIGS. 20-21 may generally correspond to the structure and/or function of satellite 200-1 described elsewhere in this document, but are not limited such descriptions.

In the embodiment of FIG. 20, earth station 2100 may include antennas 2002 and 2004. C1S2 preferably communicates with antenna 2002, and C2S1 preferably communicates with antenna 2004. In this embodiment, communication activity among satellites C1S2 and C2S2 may be segregated according to communication direction. Thus, for example, C1S2 may be dedicated to transmitting data to satellite 2002, and C2S2 may be dedicated to receiving data from satellite 2004. Such separation of communication activity may be operable to decrease noise arising when conducting bi-directional communication using a single satellite, may increase signal strength, and/or may increase effective data transmission throughput by some finite amount, such as by 10-20%. In other embodiments, satellites C1S2 and C2S2 could communicate with two respective earth station antennas 2002, 2004, but one or both of C1S2 and C2S2 could simultaneously transmit and receive data.

FIG. 21 shows the multiple constellation embodiment of FIG. 20 in which adjacent satellites C1S2 and C2S2 both communicate with the same antenna 2002. In this embodiment, the additional bandwidth provided by the use of multiple constellations is preferably operable to provide complete redundancy in the event that one of satellites C1S2 and C2S2 fails. More specifically, communication system 100 and satellite system 104 may be configured so as to enable each of satellites C1S2 and C2S2 to fully service the needed communication with antenna 2002 of earth station 2100. Thus, if either satellite in communication with antenna 2002 were to fail, the other of the two would preferably enable communication with antenna 2002 to continue without loss of data or loss of communication bandwidth. FIGS. 20-21 illustrate two respective ways of exploiting the additional communication bandwidth made available by the provision of an additional constellation C2. It is noted that the system and method disclosed herein are not limited to practicing only one of the benefits of additional bandwidth at a time. Otherwise stated, at any given moment, satellite system 104 may employ some combination of communication redundancy; dedication of one or more satellites for just one of transmission and reception; and/or other benefit of added bandwidth. Other benefits of such additional benefits were described above.

The above discussion is directed to embodiments of satellite system 104 that include two satellite constellations C1 and C2. However, it will appreciated by those of skill in the art that the benefits of supplementing system 104 with additional constellations may be extended to the addition of any number of constellations, with each such added constellation having any number of satellites.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:
1. A method, comprising:
providing at least one satellite having a plurality of beamformers configured to provide a plurality of respective beams having a plurality of different respective fixed pitch angles about an axis of the satellite, wherein each said beamformer is an individual antenna feed;
causing the at least one satellite to move around the earth along a non-geostationary orbit;
establishing a data communication path between a first of the beamformers on the satellite and a communication target, the data communication path having a satellite end at the first beamformer and an target end at the communication target;
shifting the satellite end of the data communication path through a succession of the beamformers as the satellite moves along its orbit; and
directing substantially all RF wave energy for said data communication path to/from said satellite through just one said beamformer at a time.

2. The method of claim 1 wherein the plurality of respective beams have a plurality of different respective fixed pitch angles about a lateral axis of the satellite.

3. The method of claim 1 wherein the communication target is a first antenna, at an Earth station, configured to communicate with the satellite along a selected segment of the orbit of the satellite, the first antenna being an Earth end of the data communication path.

4. The method of claim 1 wherein the communication target is another satellite.

5. The method of claim 1 further comprising:
not directing any RF wave energy to beamformers of the plurality of beamformers not forming part of the data communication path.

6. The method of claim 1 wherein the satellite further includes at least one reflector operable to reflect RF wave energy from the plurality of beamformers toward the communication target and to reflect RF wave energy from the communication target toward the plurality of beamformers.

7. The method of claim 1 wherein the orbit is at least substantially equatorial.

8. The method of claim 1 wherein the latitude of the orbit remains between −10 and +10 degrees latitude.

9. The method of claim 1 wherein the latitude of the orbit remains between −5 and +5 degrees latitude.

10. The method of claim 1 wherein the altitude of the satellite orbit is between 600 km and 30,000 km.

11. The method of claim 1 wherein the altitude of the satellite orbit is between 5,000 km and 10,000 km.

12. The method of claim 1 wherein the altitude of the satellite orbit is between 7,000 km and 8,000 km.

13. The method of claim 3 further comprising:
the first antenna at the earth station tracking the satellite using a steering mechanism to cause the first antenna to substantially continuously point toward the satellite.

14. The method of claim 3 further comprising:
the first antenna quasi-tracking the satellite by transferring the earth end of the data communication path through a succession of fixed antenna beams, wherein each said antenna beam has a substantially fixed orientation with respect to the surface of the Earth.

15. The method of claim 1 further comprising directing RF wave energy to the beamformer, of the plurality of beamformers, serving as the satellite end of the data communication path.

16. The method of claim 3 further comprising:
maintaining the data communication path between the first antenna and the first beamformer over a range of satellite movement corresponding to a communication alignment range between the beam from the first beamformer and the first antenna.

17. The method of claim 16 further comprising:
commencing communication between the first antenna and the first beamformer when the first antenna and the beam generated by the first beamformer reach an initial communication alignment boundary during movement of the satellite along its orbit; and
concluding communication between the first antenna and the first beamformer when the first antenna and the beam generated by the first beamformer reach a final communication alignment boundary during movement of the satellite along its orbit.

18. The method of claim 17 wherein communication power between the first antenna, at the earth station, and the first beamformer reaches a peak at centroid-to-centroid alignment between the first antenna and the first beamformer.

19. The method of claim 18 wherein the first antenna communicates with the first beamformer while the communication power along the data communication path is equal to or greater than one half the peak communication power.

20. The method of claim 16 wherein the shifting step comprises:
transferring the satellite end of the data communication path from the first beamformer to a second beamformer of the plurality of beamformers once a second antenna at the earth station and a beam from the second beamformer enter into communication alignment range.

21. The method of claim 20 wherein the transferring step comprises:
redirecting RF wave energy, originating from an amplifier on the satellite, from the first beamformer to the second beamformer.

22. The method of claim 21 wherein the redirecting step is performed using a waveguide switch.

23. The method of claim 21 further comprising repeating the steps of transferring and redirecting for the plurality of the beamformers on the satellite so as to maintain operation of the data communication path between the satellite and the earth station throughout the movement of the satellite through the selected segment of the orbit of the satellite.

24. An apparatus, comprising
a satellite having a plurality of beamformers configured to provide a plurality of respective beams having a plurality of different respective fixed pitch angles about an axis of the satellite, wherein each said beamformer is an individual antenna feed; and
a controller operable to direct a data communication path through a first beamformer of the plurality of beamformers,
wherein the controller is further operable to shift the data communication path through a succession of the beamformers;
wherein the controller is further operable to direct substantially all RF wave energy for said data communication path to/from said satellite through just one said beamformer at a time.

25. The apparatus of claim 24 wherein the plurality of different respective fixed pitch angles are about a lateral axis of the satellite.

26. The apparatus of claim 24 wherein the controller is operable to redirect the data communication path from the first beamformer to a second beamformer of the plurality of beamformers upon detecting a decline in communication power along the data communication path.

27. The apparatus of claim 24 further comprising an amplifier able to supply RF wave energy to one or more of the plurality of beamformers, wherein the controller is operable to select at least one beamformer, of the plurality of beamformers, to direct the RF wave energy to.

28. The apparatus of claim 24 wherein the plurality of beamformers are disposed in an array on the satellite, having a plurality of rows,
wherein each beamformer row includes a sequence of beamformers configured to illuminate footprints on the Earth over a range of longitude but with substantially similar latitude; and
wherein the plurality of rows are configured to illuminate respective groups of footprints at a plurality of different respective latitudes.

29. A method, comprising:
providing a first constellation of satellites within a satellite system;
providing at least one additional constellation of satellites to provide a plurality of satellite constellations within the satellite system;
enabling adjacent ones of the satellites in the satellite system to communicate with a single earth station; and
wherein at least one of the satellites in each said constellation has a plurality of beamformers configured to provide a plurality of respective beams having a plurality of different respective fixed pitch angles about a lateral axis of the satellite, wherein each said beamformer is an individual antenna feed; and directing a data communication path through a first beamformer of the plurality of beamformers;

shifting the data communication path through a succession of the beamformers; and directing substantially all RF wave energy for said data communication path to/from said satellite through just one said beamformer at a time.

30. The method of claim 29 further comprising:
the adjacent satellites communicating with the earth station employing the same transmission frequency.

31. The method of claim 29 further comprising:
dedicating at least selected ones of the beamformers in the satellite system substantially completely to one of:
transmission; and
reception.

32. The method of claim 30 further comprising:
supplementing the satellite system in a given state with at least one further constellation to provide a modified satellite system without disrupting an operation of the satellite system in the given state.

33. The method of claim 31 further comprising:
dedicating at least selected ones of the satellites in the satellite system substantially completely to one of:
transmission; and
reception.

34. A method, comprising:
conducting a data communication session between a first computing entity and a second computing entity over a communication network;

wherein at least a portion of the data transferred over the communication network during the data communication session is transmitted over a satellite system including a plurality a satellites;

wherein at least one of the satellites in said satellite system has a plurality of beamformers configured to provide a plurality of respective beams having a plurality of different respective fixed pitch angles about an axis of the satellite and a controller operable to direct a data communication path through a first beamformer of the plurality of beamformers, wherein each said beamformer is an individual antenna feed;

the controller shifting the data communication path through a succession of the beamformers; and directing substantially all RF wave energy for said data communication path to/from said satellite through just one said beamformer at a time.

35. The method of claim 1 wherein the directing step comprises:
directing all of the RF wave energy for the data communication path through just one said beamformer at a time.

* * * * *